(12) United States Patent
Newman

(10) Patent No.: US 7,195,176 B2
(45) Date of Patent: Mar. 27, 2007

(54) TEMPERATE WATER SUPPLY SYSTEM

(76) Inventor: Roger R. Newman, 20 Lytton Blvd., Toronto, Ontario (CA) M4R 1L1

(*) Notice: Subject to any disclaimer, the term of this patent is extended or adjusted under 35 U.S.C. 154(b) by 476 days.

(21) Appl. No.: 10/694,834

(22) Filed: Oct. 29, 2003

(65) Prior Publication Data

US 2005/0092261 A1 May 5, 2005

(51) Int. Cl.
F24H 9/20 (2006.01)
F24H 1/48 (2006.01)

(52) U.S. Cl. .............. 236/20 R; 122/14.1; 122/18.5; 137/338; 137/340

(58) Field of Classification Search ......... 236/20 R; 122/14.1, 18.5, 20 R, 417; 137/338, 340; 165/172
See application file for complete search history.

(56) References Cited

U.S. PATENT DOCUMENTS

| | | | |
|---|---|---|---|
| 4,017,028 A | 4/1977 | Manor | |
| 4,111,259 A | 9/1978 | Lebduska | |
| 4,125,107 A | 11/1978 | Nurnberg | |
| 4,128,123 A | 12/1978 | Garriss et al. | |
| 4,143,814 A | 3/1979 | Hill, Jr. | |
| 4,211,187 A * | 7/1980 | Farris | 122/20 B |
| 4,215,551 A | 8/1980 | Jones | |
| 4,275,687 A | 6/1981 | Sasaki | |
| 4,320,870 A | 3/1982 | Manor | |
| 4,324,224 A | 4/1982 | Cox et al. | |
| 4,538,426 A | 9/1985 | Bock | |
| 4,575,615 A | 3/1986 | Shigenobu et al. | |
| 4,633,676 A * | 1/1987 | Dittell | 62/238.6 |
| 4,742,682 A | 5/1988 | Assaf et al. | |
| 4,747,980 A | 5/1988 | Bakay et al. | |
| 4,909,045 A | 3/1990 | Melzi | |
| 4,949,547 A | 8/1990 | Shimizu | |
| 4,955,207 A | 9/1990 | Mink | |
| 5,092,520 A | 3/1992 | Lestage | |
| 5,103,802 A * | 4/1992 | Thomason | 126/610 |
| 5,181,387 A | 1/1993 | Meckler | |
| 5,203,500 A * | 4/1993 | Horne, Sr. | 237/19 |
| 5,245,984 A | 9/1993 | Longmore et al. | |
| 5,366,152 A | 11/1994 | Gössi | |
| 5,421,039 A | 6/1995 | Hirashiba et al. | |
| 5,584,735 A | 12/1996 | McMath | |
| 5,606,865 A * | 3/1997 | Caron | 62/238.1 |
| 5,671,771 A | 9/1997 | Brandel | |

(Continued)

Primary Examiner—Marc Norman
(74) Attorney, Agent, or Firm—Bereskin & Parr

(57) ABSTRACT

A temperate water supply is provided. The temperate water supply system includes a temperate water storage tank and a heat exchanger. The temperate water storage tank has a first tank inlet, a first tank outlet, a second tank inlet and a second tank outlet. The first tank inlet is connectable to a cold water source. The first tank outlet is connectable to at least one temperate water use point in the residence. The heat exchanger has a heat exchanger inlet and a heat exchanger outlet and a plurality of water conduits connected in parallel fluid communication with the heat exchanger inlet and with the heat exchanger outlet. The heat exchanger inlet is connectable to the second tank outlet, and the heat exchanger outlet is connectable to the second tank inlet. In use, the plurality of water conduits are filled with water and are in contact with ambient air in the residence that is warmer than the water at least a portion of the time, so that heat is transferred from the ambient air to the water.

24 Claims, 25 Drawing Sheets

U.S. PATENT DOCUMENTS

| | | |
|---|---|---|
| 5,718,372 A | 2/1998 | Tishler |
| 5,754,090 A | 5/1998 | Arensmeier |
| 5,768,894 A | 6/1998 | Li et al. |
| 5,782,104 A | 7/1998 | Sami et al. |
| 5,829,467 A | 11/1998 | Spicher |
| 5,848,222 A | 12/1998 | Jung |
| 5,918,625 A | 7/1999 | Ziehm |
| 5,918,805 A | 7/1999 | Guyer |
| 6,037,567 A * | 3/2000 | Inoue et al. ............ 219/202 |
| 6,039,067 A | 3/2000 | Houlihan |
| 6,164,307 A | 12/2000 | Byles |
| 6,225,705 B1 | 5/2001 | Nakamats |
| 6,275,655 B1 | 8/2001 | Rixen |
| 6,311,764 B1 | 11/2001 | Schulz et al. |
| 6,357,512 B1 | 3/2002 | Baer et al. |
| 6,446,336 B1 | 9/2002 | Unger |
| 6,463,750 B2 | 10/2002 | Assaf |

* cited by examiner

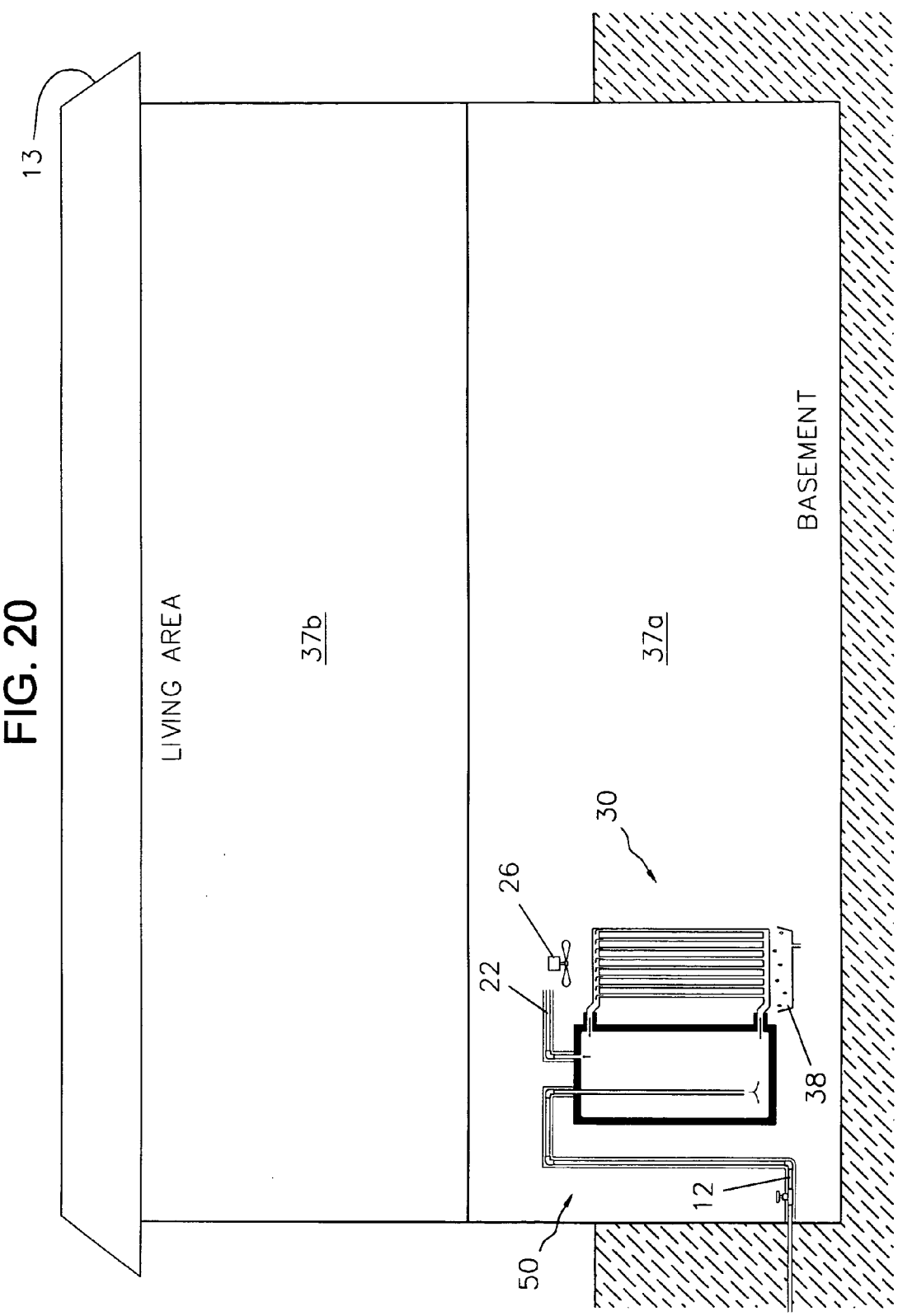

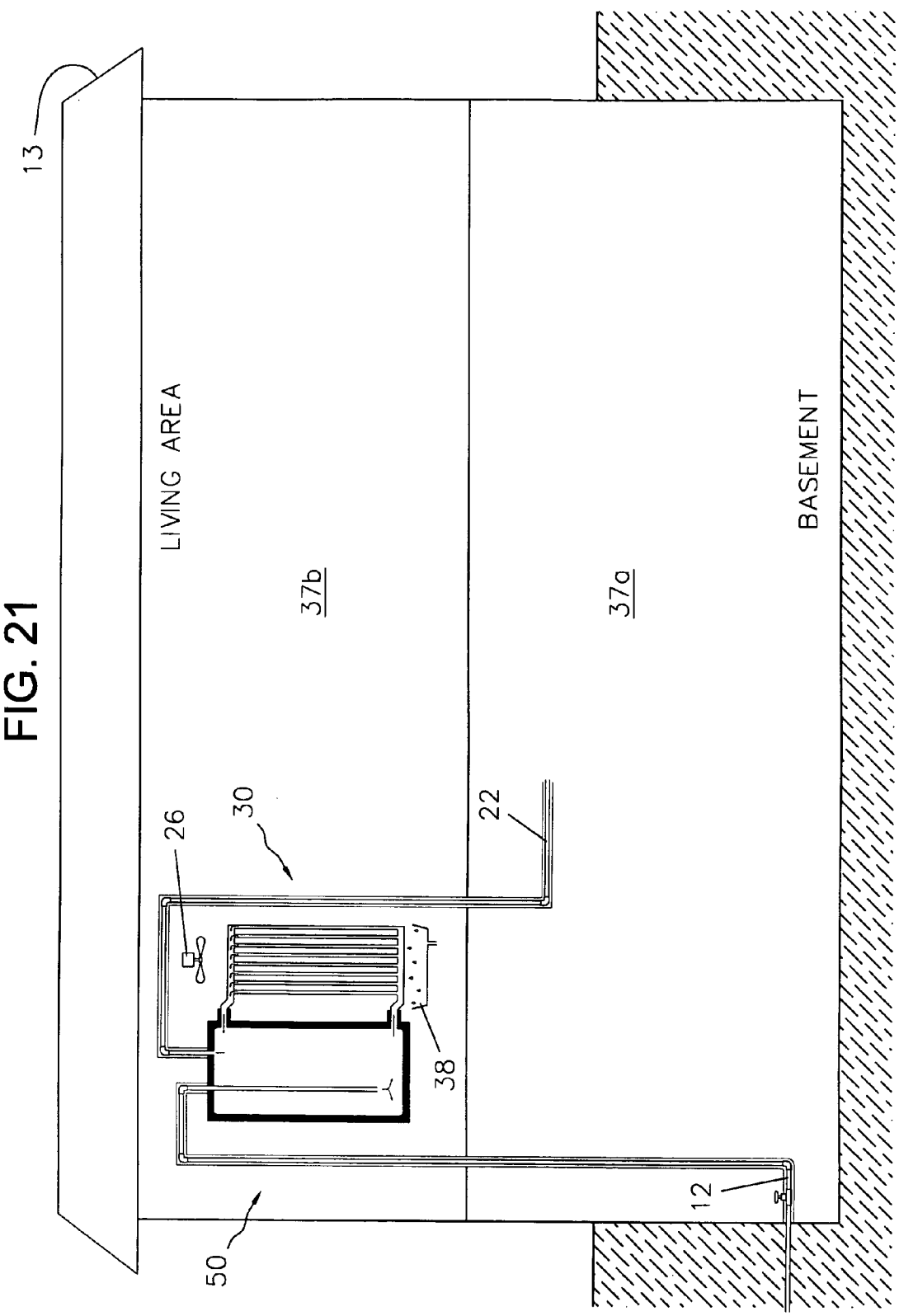

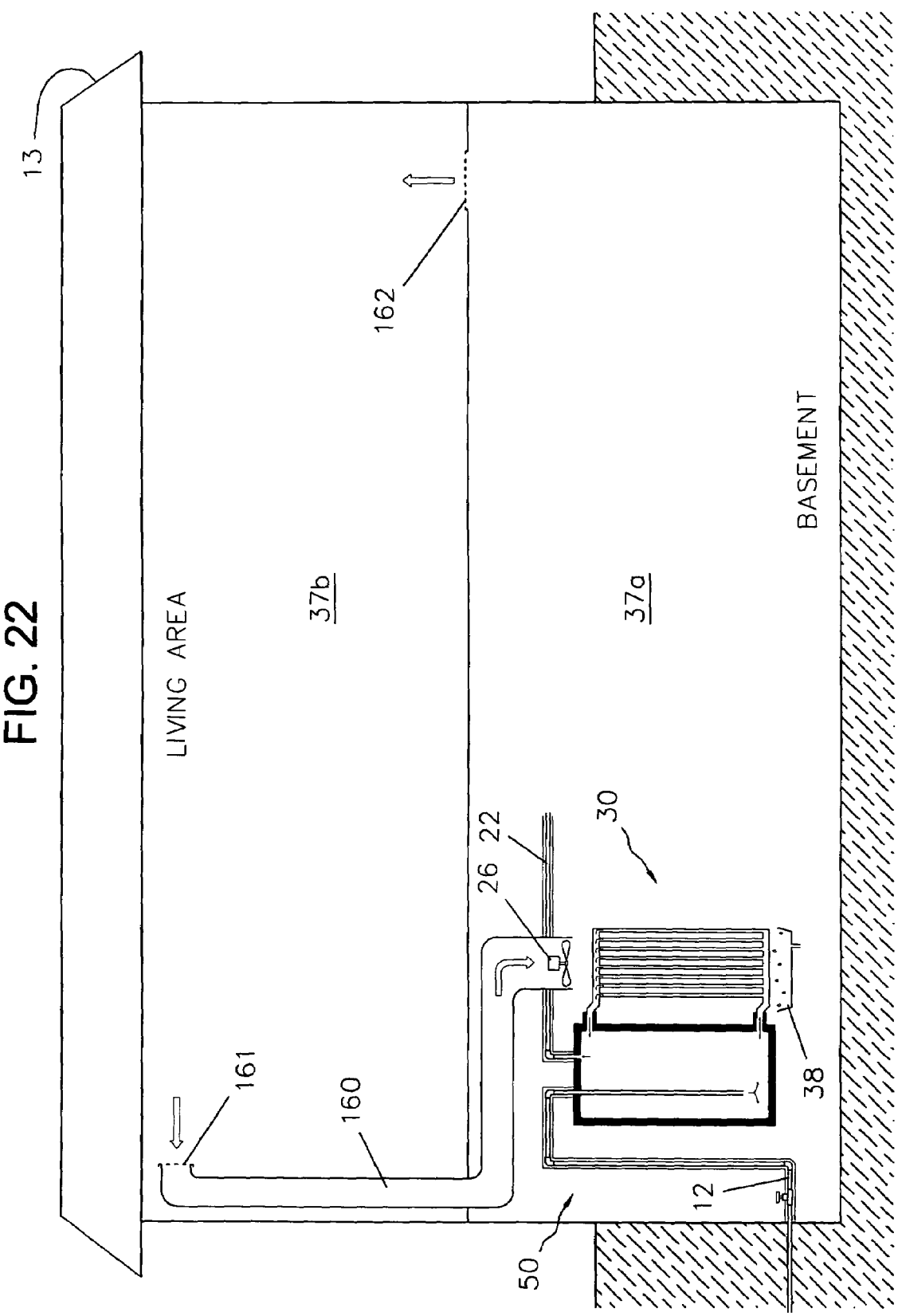

TEMPERATE WATER SUPPLY SYSTEM

FIELD OF THE INVENTION

This invention relates to a water supply system for any home or institution whereby the plumbing would provide temperate water taps for general usage, in addition to the standard cold water taps and hot water taps.

BACKGROUND OF THE INVENTION

A representational drawing of a very basic water supply system of the prior art, for a typical home is shown in FIG. 1. This shows a standard two pipe plumbing system (28) that distributes cold water and hot water to various facilities, where they are required. Water from the local municipality is piped from the main (12) into the basement of the house, where it is connected to the plumbing system feed pipe (22) that then supplies cold water to various rooms throughout the house for such facilities as kitchen sinks, toilets, washbasins, bathtubs, showers and laundry tubs. Cold water may also be supplied to certain appliances inside the home, as well as to outside taps for such things as washing the car, watering the garden, or for filling a swimming pool.

Additionally, the cold water is supplied to a hot water tank (40), wherein the cold water is heated by means of energy derived from the consumption of either gas or electricity. This hot water is then also distributed to various rooms throughout the house for most of the facilities mentioned above: kitchen sinks, washbasins, bathtubs, showers and laundry tubs, as well as to certain appliances inside the home, but generally not to toilets or to outside taps.

Depending upon the geographical location of the home, the temperature of the cold water supplied from the main may be as low as 5° C. [40° F.] or as high as 15° C. [60° F.], but generally the temperature averages about 10° C. [50° F.].

One disadvantage with cold water pipes in the home is that during the summer months, when hot and humid air comes into contact with the cold water pipes, the dew point for the air is quickly reached causing condensation to form along the cold water pipes, which then results in the familiar drips and puddles that can be very annoying, and can also be very damaging to the surrounding areas in the home. In order to help overcome this problem, the cold water pipes are generally encased in thermal insulation with a vapor retarding outer jacket, to isolate the cold water pipes from the hot and humid air.

Toilets also have similar problems with the condensation that can form on the outsides of toilet tanks and toilet bowls that have been flushed using cold water. In an attempt to overcome this problem, most toilets nowadays are supplied with an insulating plastic liner that is fastened onto the inside walls and bottoms of the toilet tanks to help isolate the porcelain of the tanks from the cold water that is contained in them. Sometimes fabric coverings are also placed around the outside of the toilet tanks, but generally there is a direct contact between the porcelain of the toilet tank and the surrounding air.

There are several problems with the use of the plastic insulating liner in toilet tanks, however. The liner inside the tank is incomplete due to the accommodation of the inlet and outlet connections for the tank. Also, the liner does not prevent condensation from forming around the outside of the porcelain toilet bowl which is in direct contact with air that may be hot and humid, while at the same time the inside of the toilet bowl has direct contact with cold water that is replenished after each flush.

There are also other locations where condensation can result from cold water pipes, such as at the connections to fixtures or appliances, or in areas where it is either impractical or impossible to insulate the pipes. In any case, the present methods that are used to protect the interior of a home from the condensation that results from the distribution of cold water inside the home suffer from several problems including those outlined above, and they depend upon defensively trying to insulate every possible pipe, fixture or appliance that may contain cold water.

A second disadvantage with cold water pipes is that usually the temperature of the water is too cold for the average person to wash their hands or face with it, or to clean their teeth with it, and so the average person also typically turns on the hot water tap in addition to the cold water tap, usually waiting for the hot water to arrive in order to raise the faucet discharge water temperature to a comfortable level, before commencing to wash or to clean teeth. This results in an unnecessary usage of hot water, as well as a wastage of water while waiting for it to become temperate enough, and then afterwards leaving the hot water pipe full of hot water which then dissipates its heat energy into the surrounding areas. There are, of course, occasions when hot water is necessary, such as for a bath or a shower, but it is wasteful of heat energy if hot water is used every time when only temperate water is required.

A third disadvantage with cold water pipes is that they are also used to supply cold water directly into hot water tanks (40), where the average temperature of the cold water which may be, for example, approximately 10° C. [50° F.] has to be raised up to the temperature of hot water, which may be, for example, approximately 54° C. [130° F.]. This means that, on average, with all of the hot water used in a home, the temperature of the cold water first has to be raised by a relatively large amount, such as by 44° C. [80° F.] for the case described above, and that the heat needed for this has to be provided by the consumption of energy, such as gas energy or electrical energy. Such consumption of energy is both wasteful of resources, and can be costly to the consumer.

Many systems have been proposed in the past for heating cold water efficiently. For example, U.S. Pat. No. 4,909,045 discloses a unit for producing hot water. However, typically such systems have many moving parts, such as pumps, and are thus relatively complex. As a result such systems are relatively high maintenance and can sometimes consume substantial amounts of power for their operation.

There is a continuing need for an improved water heating system that is simple to maintain and operate and that consumes little energy in its operation.

SUMMARY OF THE INVENTION

In a first aspect, the invention is directed to a temperate water supply system. The temperate water supply system includes a heat exchanger. The heat exchanger has a heat exchanger inlet and a heat exchanger outlet and a plurality of water conduits connected in parallel fluid communication with the heat exchanger inlet and with the heat exchanger outlet. The heat exchanger inlet is connectable to a cold water source, and the heat exchanger outlet is connectable to at least one temperate water use point. In use, the plurality of water conduits are filled with water and are in contact with ambient air that is warmer than the water at least a portion of the time, so that heat is transferred from the ambient air to the water.

In a second aspect, the invention is directed to a domestic water supply system incorporating the temperate water supply system described above. The domestic water supply additionally includes a hot water storage tank having a hot water tank inlet and a hot water tank outlet. The hot water tank outlet is connected to at least one hot water use point. The hot water tank inlet is connected to at least one of the temperate water tank outlet and the cold water source.

In a third aspect, the invention is directed to a temperate water supply system. The temperate water supply system includes a heat exchanger. The heat exchanger has a heat exchanger inlet and a heat exchanger outlet and at least one water conduit connected in fluid communication with the heat exchanger inlet and with the heat exchanger outlet. The heat exchanger inlet is connectable to a cold water source, and the heat exchanger outlet is connectable to at least one temperate water use point. The at least one water conduit is configured to form a generally circuitous path between the heat exchanger inlet and the heat exchanger outlet to promote the transmission of heat from ambient air around the heat exchanger to water in the at least one water conduit.

In a fourth aspect, the invention is directed to a method of providing temperate water, comprising:

heating water up to room temperature using heat from ambient air; and storing said heated water in a temperate water storage tank.

In a fifth aspect, the invention is directed to a method of providing hot water, comprising:

heating water up to room temperature using heat from ambient air; and sending said heated water to a hot water tank; and further heating said heated water in said hot water tank.

In a sixth aspect, the invention is directed to a method of inhibiting condensation on a toilet, comprising:

supplying the toilet with temperate water.

BRIEF DESCRIPTION OF THE DRAWINGS

For a better understanding of the present invention and to show more clearly how it may be carried into effect, reference will be made by way of example to the accompanying drawings, in which:

FIG. 20 shows a representational view of a parallel type heat-exchanger and temperate water tank with side entry connections located in home installation option 1.

FIG. 21 shows a representational view of a parallel type heat-exchanger and temperate water tank with side entry connections located in home installation option 2.

FIG. 22 shows a representational view of a parallel type heat-exchanger and temperate water tank with side entry connections located in home installation option 3.

DETAILED DESCRIPTION OF THE INVENTION

Figure 1:
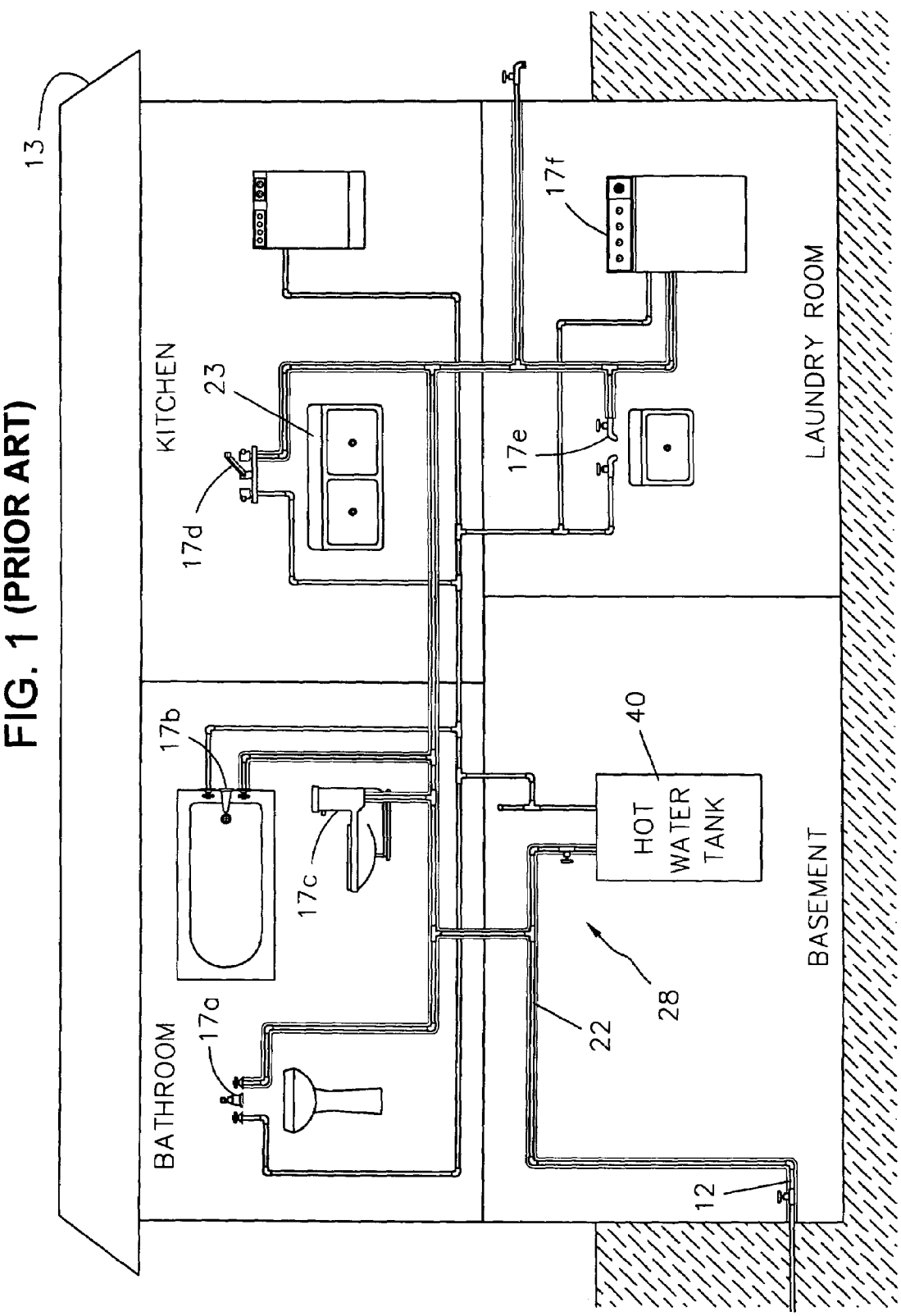
FIG. 1 shows a representational view of a very basic two pipe water supply system for a typical home that is in standard use today.
Figure 2:
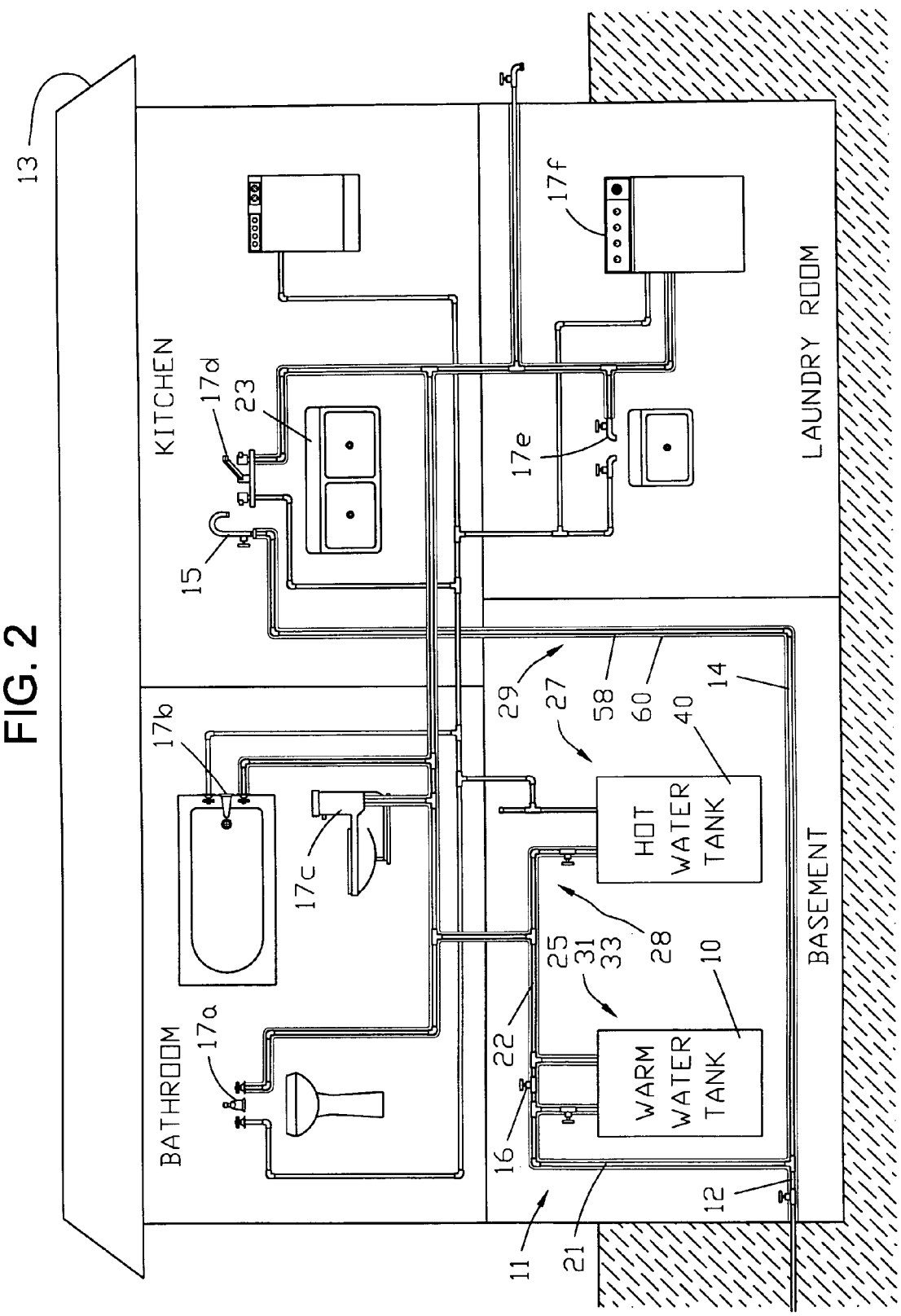
FIG. 2 shows a representational view of a proposed very basic three pipe water supply system that would be suitable for a typical home.

Reference is made to FIG. 2, which shows a domestic water supply system (11) in accordance with a first embodiment of the present invention. The domestic water supply system (11) provides temperate water for general use in a building (13) at, for example, a bathroom faucet (17a), a bath/shower (17b), a toilet (17c), a kitchen faucet (17d), a laundry basin (17e), and a washing machine (17f). The domestic water supply system (11) may also optionally provide cold water and hot water to some or all of the aforementioned points, as needed. For example, the domestic water supply system (11) may be a "three pipe" system, which is capable of providing temperate water, hot water and cold water. The water supply system (11) may be configured to provide temperate water for direct use at most or all locations in a home. However, this does not mean that extra pipes would need to be installed to every plumbing fixture or appliance, because the temperate water supply could replace the cold water supply at the fixture or appliance in many cases. For many fixtures and appliances, temperate water is preferable to cold water, and thus the cold water supply could be replaced without a loss of functionality. It is, of course, alternatively possible that temperate water, hot water and cold water could be supplied to some fixtures and appliances, where a greater degree of choice of water temperature is needed by the user. For example, a kitchen faucet may be provided with temperate water, hot water and cold water. It will be noted that the term 'use point' may be used to indicate a fixture or appliance whereat water is used. It will be further noted that the term "building" refers to any home, residence, apartment building or apartment, commercial property in which people therein require water. Other examples of buildings include public bathroom facilities such as are supplied at public parks.

A representational drawing of domestic water supply system (11) in accordance with an embodiment of the present invention for a typical home (13) is shown in FIG. 2. The domestic water supply system (11) may be made up of a temperate water supply system (25, 31 or 33), a hot water supply system (27), and a cold water supply system (29). This shows a three pipe system that distributes cold water, temperate water, and hot water to the various facilities of the plumbing system (28) that require them. In this case, cold water from the main (12) is connected directly to the temperate water tank (10) which is the primary component of temperate water supply system (25, 31 or 33), and which is where the cold water is heated to become temperate water. After heating, the water in the temperate water tank (10) may have a temperature that is approximately room temperature, and accordingly ranges between about 21° C. [70° F.] and about 27° C. [80° F]. This temperate water may then be distributed, via the plumbing system feed pipe (22), to any suitable fixtures and appliances (ie. use points) in the home (13), as well as to the hot water tank (40), instead of, or in addition to the cold water that would normally be supplied to them. Cold water from the main (12) may also be piped (14) to a new separate tap (15) at the kitchen sink (23), to use for drinking or cooking purposes, and to any other use point in the residence (13) where it is desired.

The cold water pipe (21) from the main (12) to the temperate water tank (10), and the cold water pipe (14) from the main (12) to the cold water tap (15) at the kitchen sink, may be enveloped in insulation (58) and jacketed with vapor barriers (60) to prevent condensation occurring thereon. The temperate water pipes that supply the various fixtures and appliances may optionally be free of insulation and vapor barriers, since the temperature of the temperate water pipes will likely not be below the dew point of any hot and humid air that may come into contact with them. However, it may be worthwhile to provide the insulation (58) and the vapor barriers (60) on the temperate water pipes just in case the capacity of the temperate water tank (10) is overwhelmed due to excessive use, or in case the temperate water tank (10) is bypassed for some reason, by means of the bypass valve (16).

Figure 3:
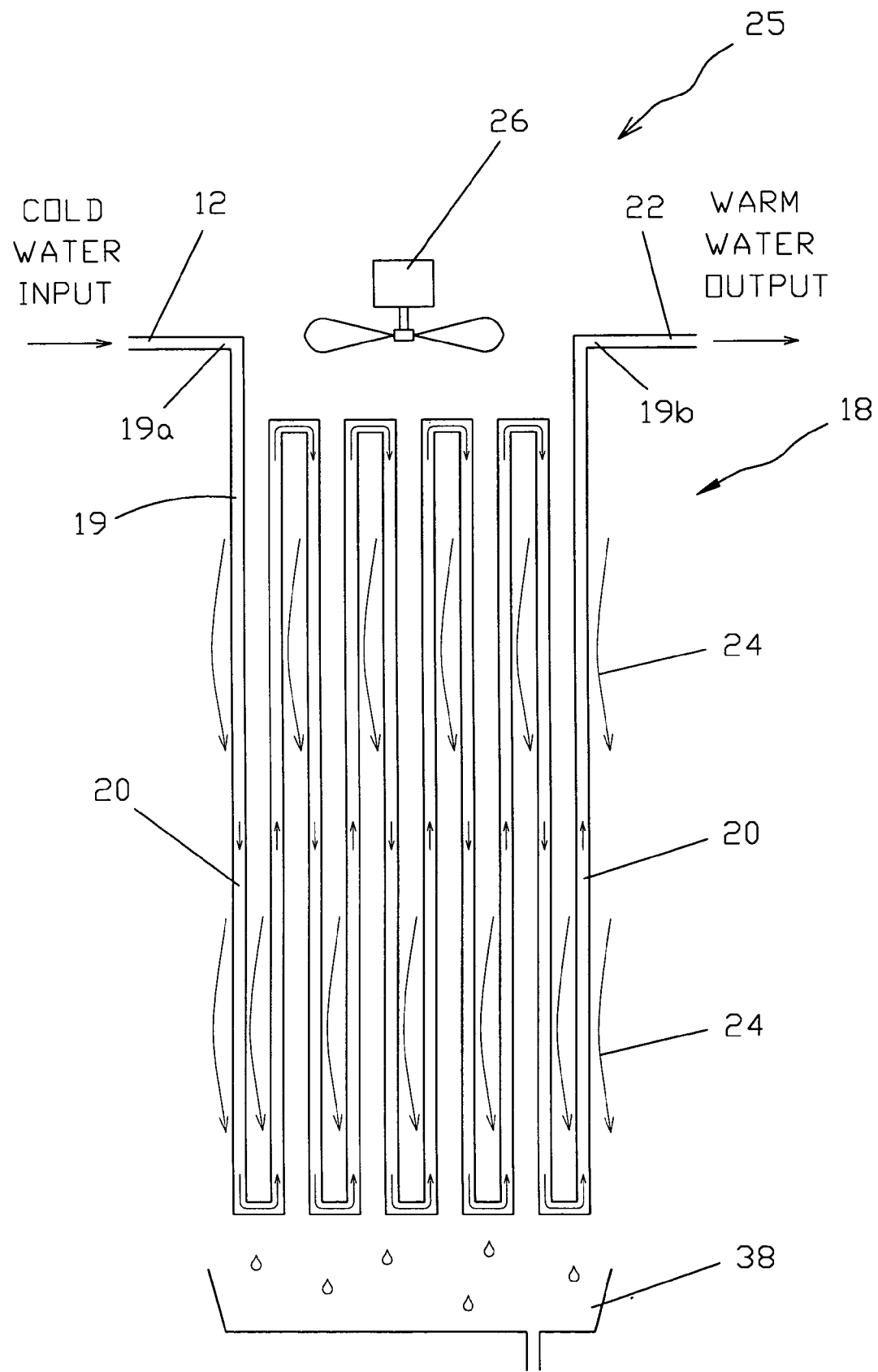
FIG. 3 shows a representational view of a series type heat-exchanger for a temperate water supply system.

Reference is made to FIG. 3. In one form, the temperate water supply system (25) could consist of a series type heat exchanger (18) that is placed in series with the cold water pipe (21) that is connected directly to the water main (12) from the municipality. As shown in FIG. 3, the cold water travels through a water conduit (19) of the heat exchanger (18) on its way to feeding the plumbing system (28) via the feed pipe (22) of a home. The water conduit (19) causes the water to travel along a circuitous path between a heat exchanger inlet (19a) and a heat exchanger outlet (19b). At the same time, ambient air (24) that is warmer than the cold water inside the pipes, is allowed to make direct contact with the outsides of the water conduit (19) of the heat exchanger (18) and thereby impart its heat energy onto the water conduit (19), which in turn conducts the heat energy to the cold water inside the water conduit (19). The cooled ambient air (24) becomes heavier as a result, and falls downwards along the lengths of the water conduit (19) and then outwards back into the ambient air (24) when it reaches the bottom of the heat exchanger (18). The falling cooled air (24) is replaced by more temperate air (24) at the top of the heat exchanger (18), which then imparts its heat energy to the water conduit (19), and so on. As the cycle repeats, the water conduit (19), and the cold water inside it, progressively approach the same temperature as the ambient air (24) around the outside of the water conduit (19). This process can be speeded up by means of an optional fan (26) that is placed above, or beside, the heat exchanger (18) for blowing air over the water conduit (19).

By extending along a circuitous path, the water conduit (19) causes the water to receive a relatively greater amount of heat from the ambient air, than if the water conduit (19) extended along a direct path between the heat exchanger inlet (19a) and outlet (19b). The circuitous path may have any suitable routing that provides the desired heat transfer. For example, the path may be serpentine, as shown in FIG. 3.

The water conduit (19) may be made up of a plurality of pipes (20) which are connected in series to each other by a plurality of 180° piping elbows.

It will be noted that, aside from the operation of the optional fan, the heat exchanger (18) operates passively to warm up the cold water contained therein, and thus does not directly consume electricity or fuel for its operation.

Any condensation that forms on the water conduit (19) of the heat exchanger (18) will run down the conduit (19) and collects in the drip tray (38) underneath. Once the temperature of the water inside the series type heat exchanger (18) has become the same as the surrounding ambient air temperature (24), then any further exchange of heat will cease. If the water inside the water conduit (19) is stationary, then this will occur after a short period of time, and the series type heat exchanger (18) is ready to supply temperate water to the plumbing system (28), but only for that quantity of temperate water that resides inside the heat exchanger (18), and only until it has been replaced once again by cold water from the main (12).

If the water inside the water conduit (19) is moving in order to supply the plumbing system (28) with water, then the water in the heat exchanger (18) does not stay there long enough to gather very much heat, so the water passing through will be cold water unless the series type heat exchanger (18) is made very large.

Figure 4:
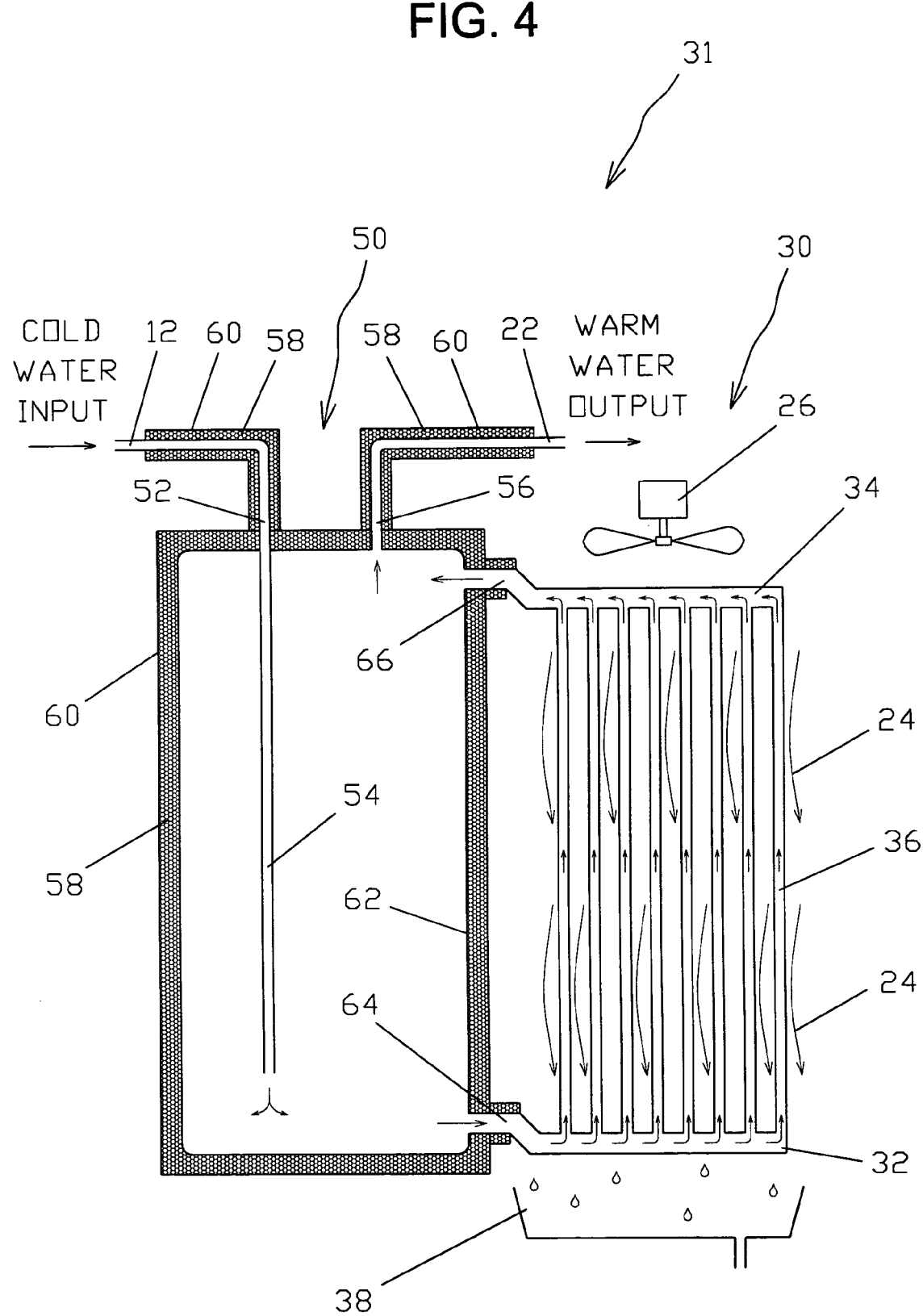
FIG. 4 shows a representational view of a parallel type heat-exchanger and temperate water tank with side entry connections.

A representational view of a temperate water supply system (31), which includes a parallel type heat-exchanger (30) and a temperate water tank (50) with side entry connections (64) and (66) is shown in FIG. 4. Cold water from the main (12) is fed into the temperate water tank (50) through an input connection (52) at the top of the tank (50) and then down through an internal pipe (54) to exit near the bottom of the tank (50). Temperate water is drawn off through an output connection (56) at the top of the tank (50), when required.

The tank (50) itself, as well as the input and output pipes, are completely covered by insulation (58), and with outer jackets (60) that are vapor barriers, in order to protect the temperate water tank (50) from any condensation or corrosion that may otherwise occur on its exterior. The interior of the temperate water tank may be provided with glass liner (62).

A parallel type heat exchanger (30) is connected to the two side entry connections (64) and (66) on the temperate water tank (50), and both of these side entry connections are externally slanted downwards away from the tank (50) to direct any condensation moisture that may form on them away from the temperate water tank (50). The lower side entry connection (64) is connected to the inlet header (32), which may also be called the lower header (32), of the heat exchanger (30), and the upper side entry connection (66) is connected to the outlet header (34), which may also be called the upper header (34), of the heat exchanger (30). The upper and lower headers (32) and (34) are themselves connected together by means of a multitude of pipes (36) that are vertical and parallel to each other, and the entire heat exchanger (30) is located such that ambient air (24) is able to freely pass around the outsides of each of the pipes (36). For the purposes of the invention, the pipes (36) may be generally vertical or may alternatively be slanted on a diagonal, and are not required to be strictly vertical. In any case, the outlet of the pipes (36) is above the inlet.

When the temperate water tank (50) has been filled with cold water from the main (12), all of the pipes (36) and both of the headers (32) and (34), are also filled with cold water. If the ambient air (24) around the heat exchanger (30) is warmer than the cold water inside the pipes (36), then the ambient air (24) imparts its heat energy to the pipes (36), which in turn conduct that heat energy to the cold water therein. If the ambient air (24) is hot and humid, then condensation will also start forming on the outsides of the pipes (36), and droplets will start running down the outsides of the pipes (36) and into the drip tray (38) that is located underneath the heat exchanger (30).

As soon as the ambient air (24) around the outsides of the pipes (36) has given up some of its heat energy, it becomes heavier and drops downwards toward the bottom of the heat exchanger (30) where it then moves outwards and back into the surrounding ambient air (24). As the heavier, cooler air moves downwards, it is replaced by more temperate ambient air (24) that, in turn imparts some of its heat to the pipes (36), before becoming heavier and dropping downwards. This cycle continues on repeating itself until the cold water inside the pipes (36) has reached the same temperature as the ambient air around the outside of the heat exchanger (30).

However, as soon as the cold water inside the pipes (36) starts to warm up, it becomes lighter than the cold water that is still inside the temperate water tank (50), and so by convection or gravity, the heavier cold water from the tank (50) starts to exit through the lower side entry connection (64) into the lower header (32), and then enters into the lower ends of the pipes (36) and the lighter temperate water contained therein moves upwards so that it exits out through the top header (34) and into the tank (50) through the top side entry connection (66) until an equilibrium is reached between the water in the heat exchanger (30) and the water in the tank (50). This dual process repeats as more and more cold water arriving in the heat exchanger (30) extracts more and more heat energy from the surrounding ambient air (24), which then transports more and more heat energy back to the temperate water tank (50).

Gradually, the cold water contained in the temperate water tank (50) becomes temperate water, which then has a natural tendency to collect in the upper half of the tank (50). This temperate water can be drawn off from the top of the tank (50) when required by the plumbing system (28) of the home (13) (see FIG. 2), and it is immediately replaced by more cold water from the main (12), which enters near the bottom of the tank (50) and has a natural tendency to collect in the lower half of the tank (50). If no temperate water is drawn off for an extended period of time, the tank (50) would eventually become full of temperate water, and the heat exchanger (30) and the tank (50) would stop the cycling process by virtue of the lack of a temperature gradient therein to drive the cycling process. In use, however, it is anticipated that there would be repeated draw-offs of temperate water into the plumbing system (28), and so the cycling process would continue indefinitely.

Although the full operation of this process as described above is passive, the efficiency of the process can be improved, and speeded up, by the addition of a fan (26) above or beside the heat exchanger to increase the flow of ambient air (24) over the pipes (36). This fan (26) can be controlled by means of a differential thermostat to ensure that the fan (26) will only operate when the temperature of the ambient air (24) around the outside of the pipes (36) is warmer than the temperature of the water that is inside the pipes (36). Also, the heat exchanger (30) can optionally be enclosed inside of a housing, (not shown), but with suitably placed vents in the housing to permit the necessary ambient air flow.

The parallel type heat-exchanger (30) shown in FIG. 4 operates at its peak efficiency only while the temperate water tank (50) is full of cold water. A temperature gradient is quickly formed by the water inside both the heat-exchanger (30) and the temperate water tank (50), with the warmest and lightest water at the top, and the coldest and heaviest water at the bottom. By the time that the temperature of the cold water inside the upper half of the temperate water tank (50) has been raised to be at or near the ambient air (24) temperature, the upper half of the heat exchanger (30), which will also contain water that is at or near the ambient air (24) temperature, can no longer exchange any heat, and thus it becomes ineffective until the temperate water in the upper half of the tank (50) has been drawn off and is replaced by more cold water from the main (12). By contrast, the lower half of the heat exchanger (30) will always contain the coldest water from the temperate water tank (50), and therefore it will always operate at peak efficiency until the temperate water tank (50) has become mostly full of temperate water.

Figure 5:
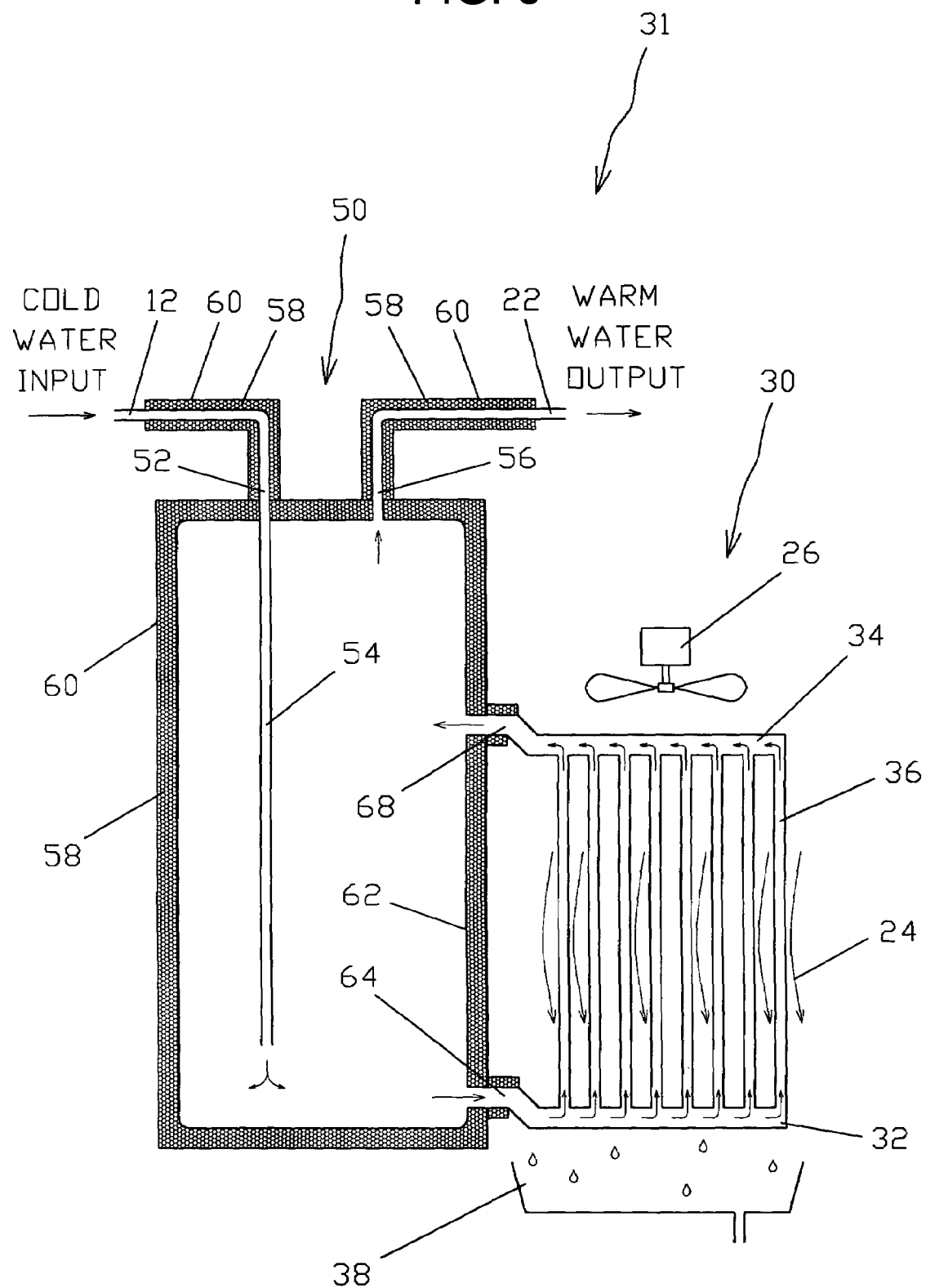
FIG. 5 shows a representational view of a shortened parallel type heat-exchanger and temperate water tank with side entry connections.

A representational view of a shortened parallel type heat-exchanger (30) and temperate water tank (50) with side entry connections (64) and (68) is shown in FIG. 5. This system takes advantage of the fact that the most efficient part of the heat exchanger (30) shown in FIG. 4 is the lower half because that is where the coldest water from the tank (50) enters the heat exchanger (30) and that is also where the largest temperature gradient exists between the water in the heat exchanger (30) and the ambient air. FIG. 5 illustrates that a shortened version of the heat exchanger (30) can be made instead of the heat exchanger (30) shown in FIG. 4. The heat exchanger (30) shown in FIG. 5 operates on the water in the lower portion, e.g. the lower half, of the temperate water tank (50), and thus retains a relatively large fraction of the efficiency of the heat exchanger (30) shown in FIG. 4, while occupying a relatively small fraction of the height of the heat exchanger (30) shown in FIG. 4. In this case, it should be noted that any temperate water entering the temperate water tank (50) from the heat exchanger (30) would rise and tend to collect in the upper half of the tank (50) before the water in the lower half of the tank (50) is warmed.

Figure 6:
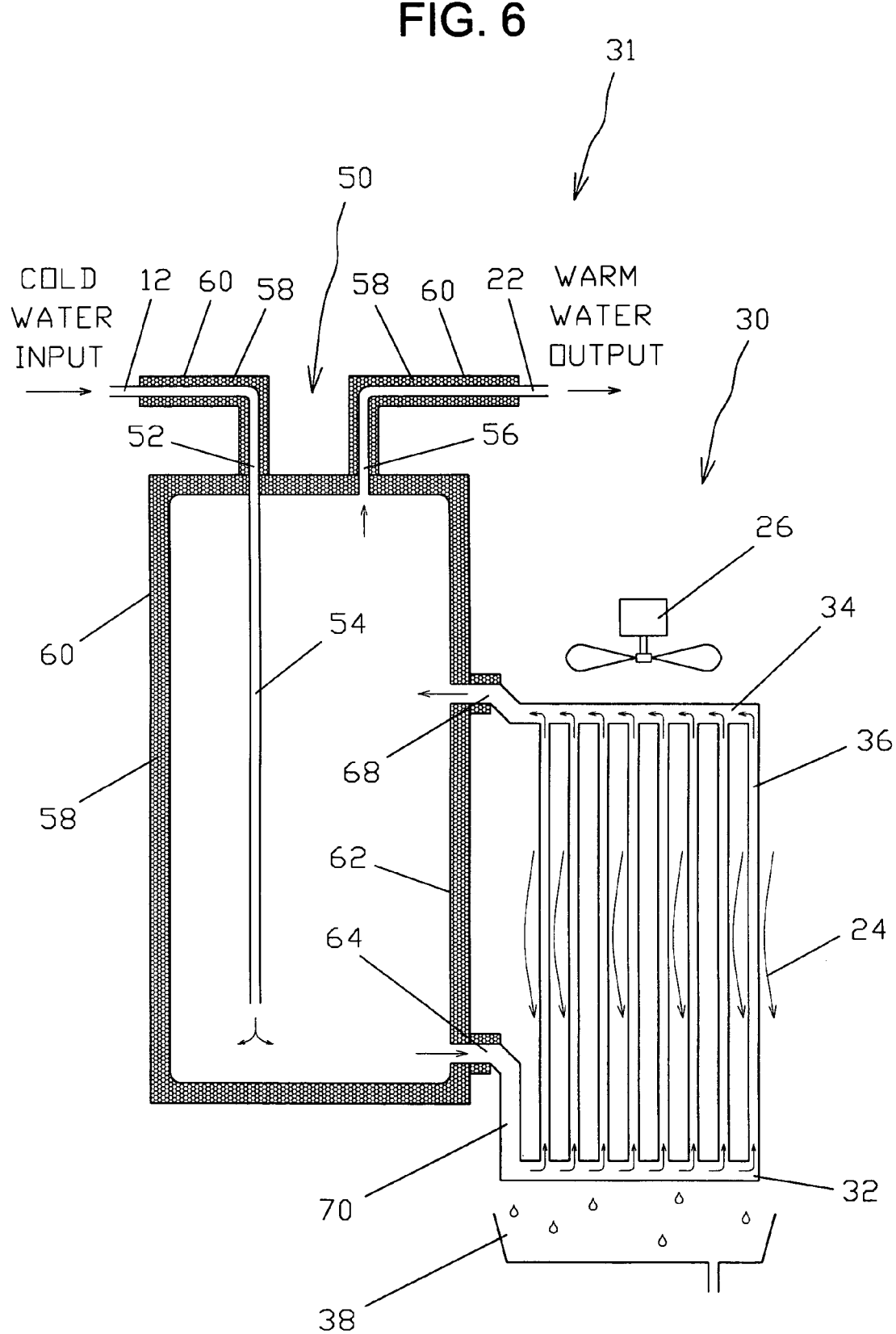
FIG. 6 shows a representational view of a shortened, but downwardly extended, parallel type heat-exchanger and temperate water tank with side entry connections.

A representational view of a shortened, but downwardly extended, parallel type heat exchanger (30) and temperate water tank (50) with side entry connections (64) and (68) is shown in FIG. 6. In this case, the heat exchanger (30) may be made more efficient by eliminating the upper portion, e.g. the upper half of the heat-exchanger (30) of FIG. 4, and by extending downwards the lower portion of the heat exchanger (30) of FIG. 4. A conduit that connects the bottom of the tank (50) to the inlet header (32) of the heat exchanger (30) may be similar to the analagous conduit shown in FIG. 4, except that an extension pipe (70) has been added, below the bottom of the tank (50). This configuration increases the efficiency of the heat exchanger (30) relative to the heat exchanger (30) shown in FIG. 5 because the coldest and heaviest water from the temperate water tank (50) will always reside in that lowest, downwardly extended, part of the heat-exchanger (30).

A slightly different version of the temperate water tank (10) is also possible, in which the upper header (34) of the heat-exchanger (30) connects into a top entry connection (82) on the tank, instead of into a side entry connection (66) or (68).

Figure 7:
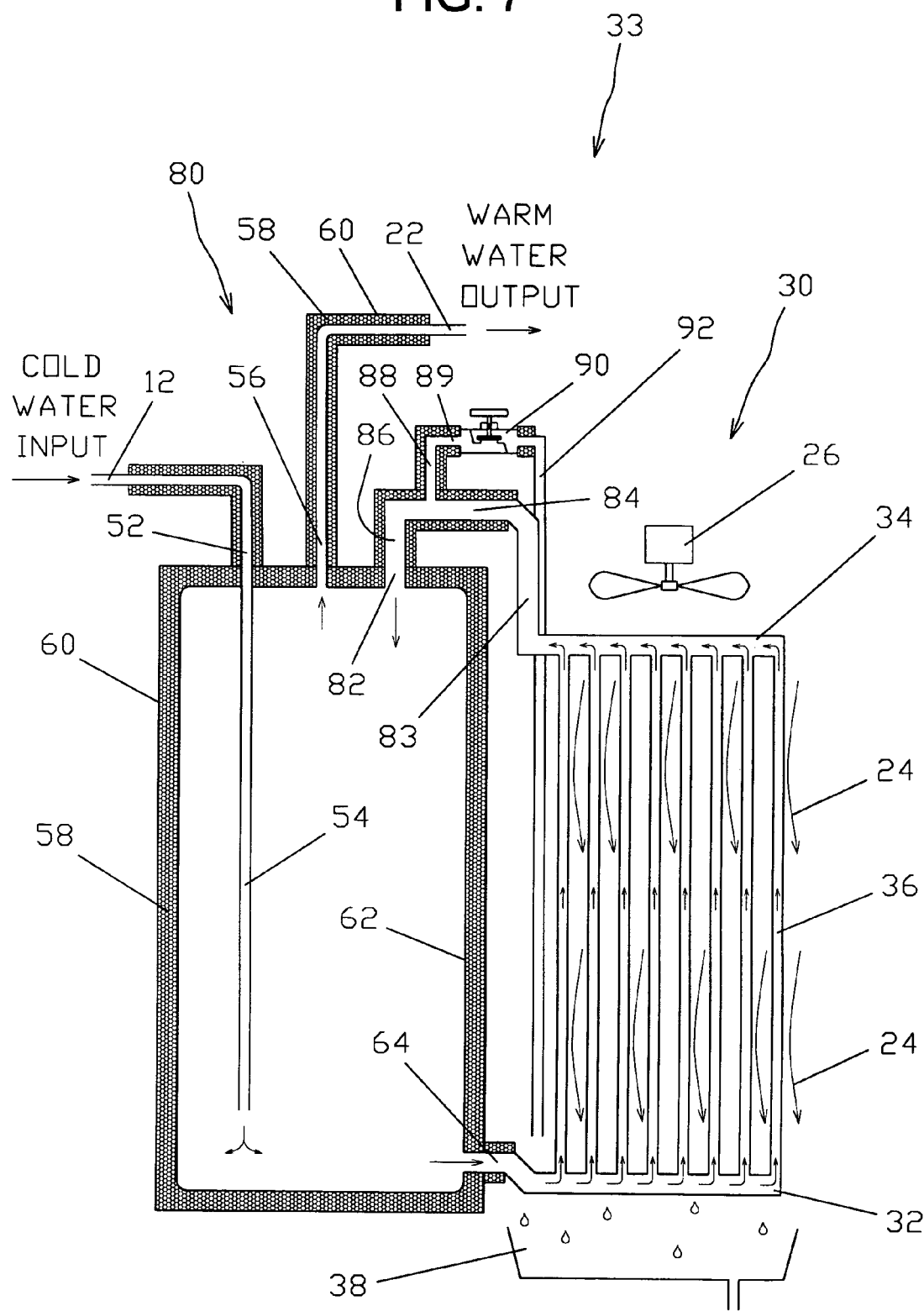
FIG. 7 shows a representational view of a parallel type heat-exchanger and temperate water tank with side and top entry connections.

A representational view of a temperate water supply system (33) comprising a parallel type heat-exchanger (30) and a temperate water tank (80) with side and top entry connections (64) and (82) is shown in FIG. 7. The temperate water supply system (33), in most aspects, functions the same way as the temperate water tank (50) with the side entry connections (64) and (66), described earlier, but with the following additional features.

In this embodiment, the lower header (32) of the heat exchanger (30) is connected to the lower side entry connection (64) of the temperate water tank (80) in the same manner as was done for the temperate water tank (50), but the upper header (34) of the heat exchanger (30) is connected via an uninsulated vertical pipe (83), an insulated horizontal pipe (84), and then an insulated vertical pipe (86) down into the top entry connection (82) of the tank (80). Also connected into the top of the insulated horizontal pipe (84) is another insulated vertical pipe (88) that connects up to another insulated horizontal pipe (89) with a bleeder valve (90), which then connects to a vertical drainage pipe (92) that extends downwards where it can empty into the drip tray (38) that is located underneath the heat exchanger (30). This bleeder valve (90) is normally turned off.

When this temperate water tank (80) is first filled with cold water from the main (12), it also fills the lower header (32) and the pipes (36) of the heat exchanger (30) with cold water, but an air lock located at the upper end of the uninsulated vertical pipe (83), as well as in the insulated horizontal and vertical pipes (84) and (86), prevents any cold water from entering those areas. The air lock would prevent any circulation of the cold and temperate water between the tank (80) and the heat exchanger (30) from occurring, and the system would not be able to function. However, if the bleeder valve (90) is opened briefly, in order to release the air lock, and then closed again and left closed for normal operation, the cold and temperate water will be able to circulate between the tank (80) and the heat exchanger (30), and the system will then function in a fashion that is similar to that of the temperate water tank (50) of FIG. 4.

It is noted here that the expected flow of temperate water from the upper header (34) of the heat exchanger (30) into the top entry connection (82) of the temperate water tank (80) passes through the insulated vertical pipe (86) in a direction that would be counter to the natural flow for the insulated vertical pipe (86), but this does not present a problem because it is easily overcome by the much more powerful natural flow that is created by the multitude of pipes (36) in the heat exchanger (30).

Figure 8:
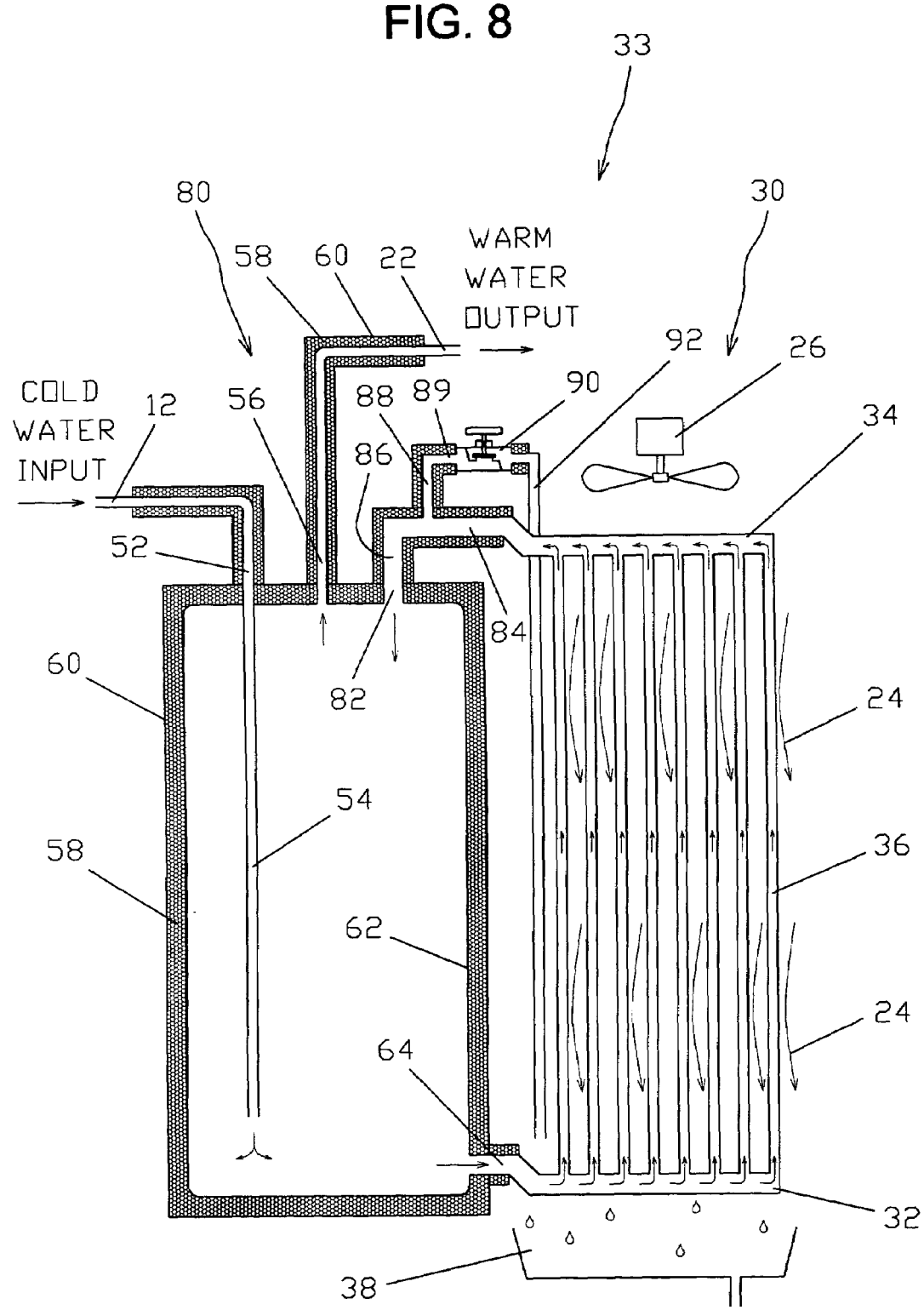
FIG. 8 shows a representational view of an upwardly extended parallel type heat-exchanger and temperate water tank with side and top entry connections.

Another alternative would be to locate the top of the heat exchanger at a higher plane than the top of the temperate water tank (80). This arrangement can be seen in FIG. 8, which shows a representational view of a temperate water supply system (33), including an upwardly extended parallel type heat-exchanger (30) and temperate water tank (80) with side and top entry connections (64) and (82). Although, at first sight, this would allow the pipes (36) to be made longer, and thus have a greater surface area, it would not improve the efficiency of the heat exchanger (30) because the warmest and lightest water from the temperate water tank (80) would always locate itself in that section of the heat exchanger (30) that lies above the top of the temperate water tank (80). As a result of this, the temperate water contained therein would not be available for use, since the temperate water outlet (56) for the tank (80) is located on the top of the tank (80), and that section of the heat exchanger (80) would thus become substantially useless.

What follows is a detailed description of the practical construction for versions of the components of the temperate water supply system of the present invention.

The upper and lower headers (32) and (34) of the parallel type heat exchangers (30) could be specially molded as single units, with all of the connections for the pipes (36) being on the same plane as each other, as shown, representationally, in FIGS. 4 through 8. The parallel type heat exchangers (30) could consist of any number of pipes (36), depending upon what capacity and efficiency is required for the temperate water tank (10, 50, 80). For example, for a typical home, the heat exchanger (30) may have 41 pipes (36).

Figure 9:
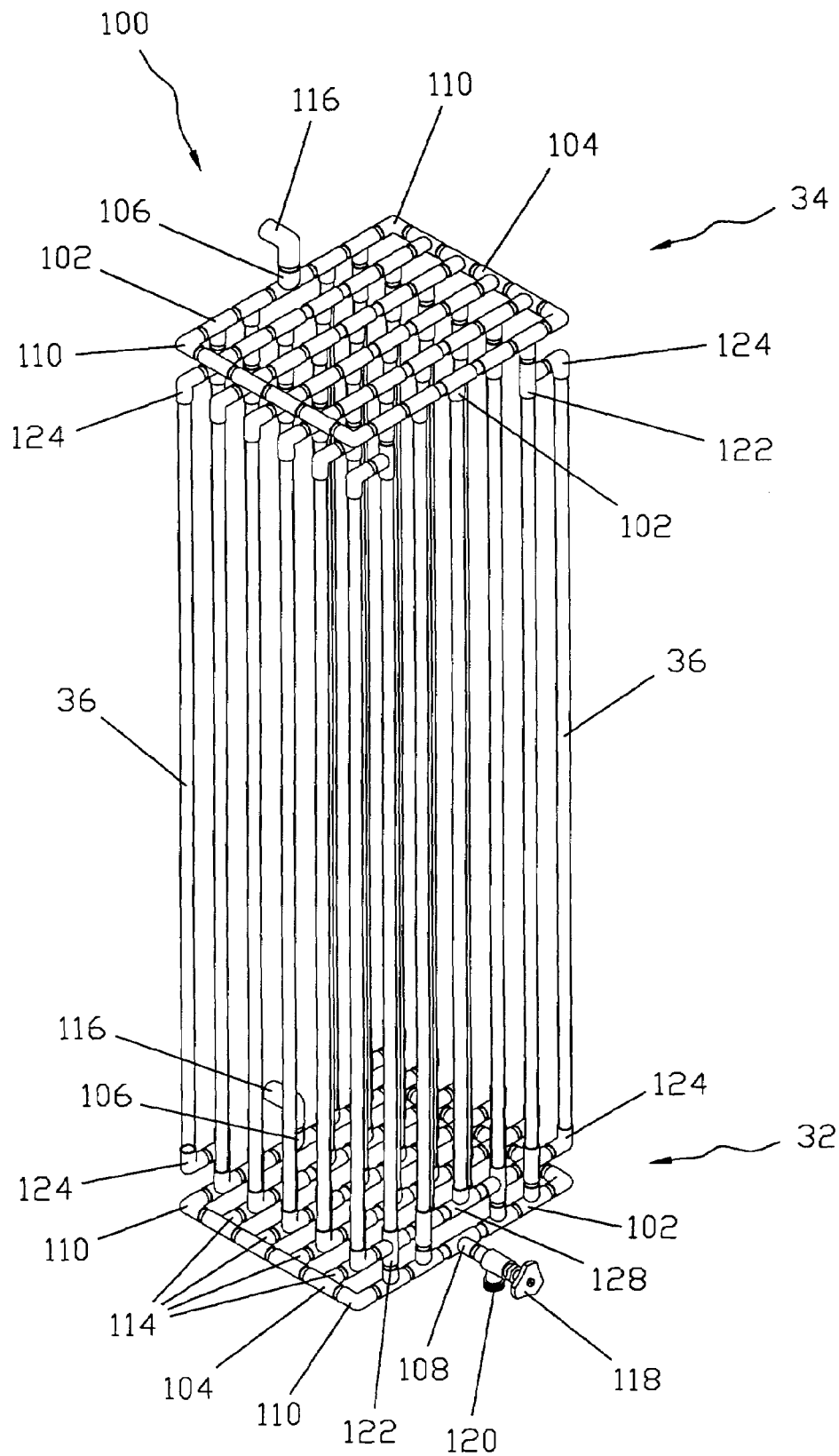
FIG. 9 shows a perspective view of a 41 pipe parallel type heat-exchanger for a temperate water tank.
Figure 10:
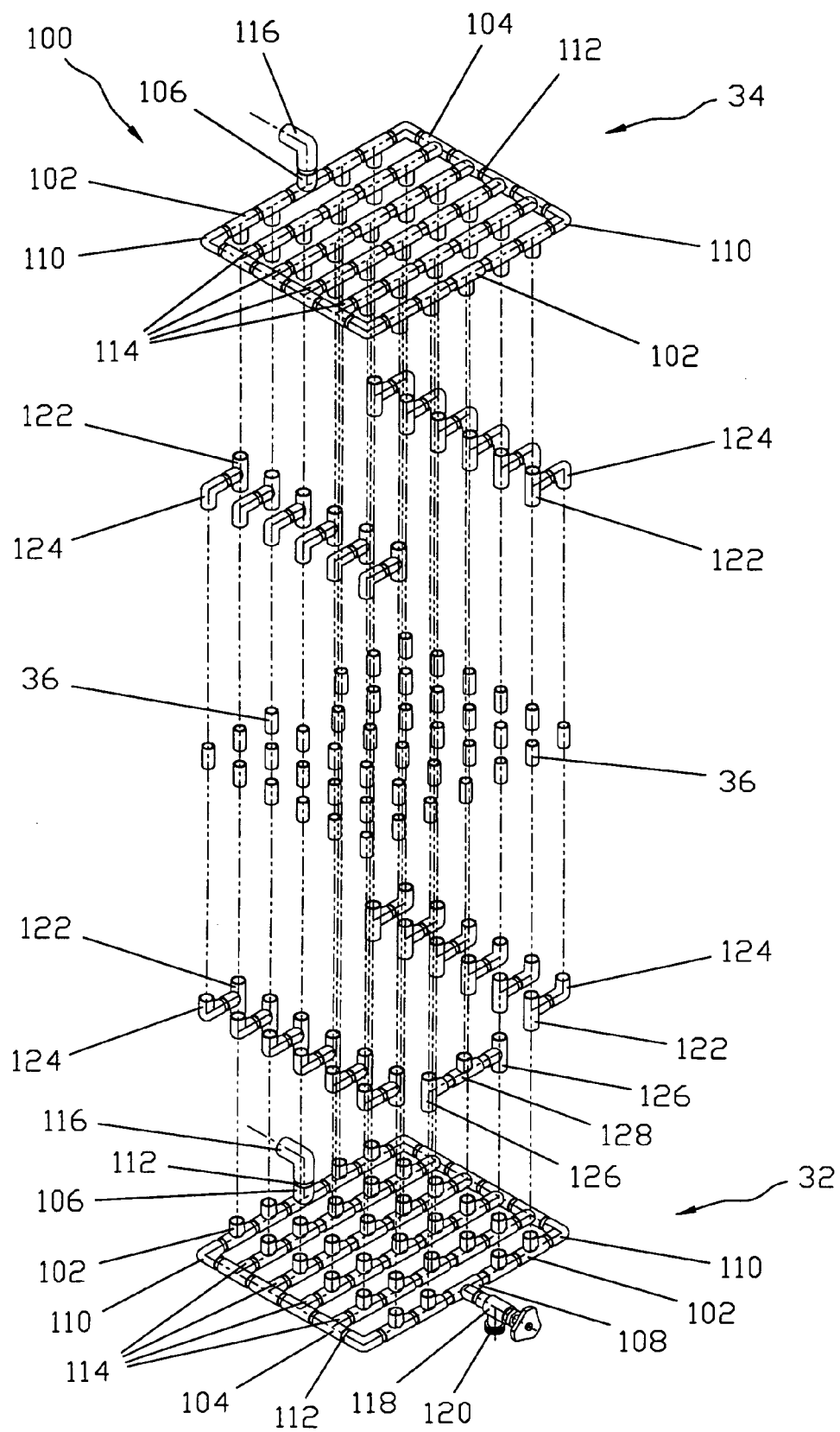
FIG. 10 shows perspective views of detailed sections of a 41 pipe parallel type heat-exchanger for a temperate water tank.

A perspective view of a 41 pipe parallel type heat exchanger (100) is shown in FIG. 9, and perspective views of the various portions of the 41 pipe parallel type heat exchanger (100) are shown in FIG. 10. The 30 lower header (32) is made up of a series of tees (102, 104, 106 and 108) in conjunction with 90° elbows (110) located at the four corners, all of which are joined together by short lengths of pipe (112) between each fitting. Most of the tees (102) are used for the connections to the lower ends of the pipes (36). Some of the tees (104) are used for the connections to four inner branches (114) of the lower header (32). One tee (106), which has a larger diameter tee connection for improved flow rate, is used for connection to the lower side entry (64) of the temperate water tank (50) or (80), via a larger diameter 90° elbow (116). The remaining tee (108) is used for connection to a drain valve (118) with a hose connection (120).

The upper or outlet header (34) is essentially the mirror image of the lower or inlet header (32), with the exception that the tee connection (106) and the 90° elbow (116) that have the larger diameters for connection to the upper side entry (66) of tank (50), or to the top entry (82) of tank (80), are directed generally upwards from the plane of the outlet header (34). Also, the tee (108) that was used for connection to a drain valve (118) in the lower header (32) is not needed for the upper header (34), and so in its place is another tee (102) that is added to the tees (102) that are used for connections to the upper ends of the pipes (36).

In those locations where the tees (104) are used for the connections to the four inner branches (114) in the lower and upper headers (32) and (34), there are no direct connections to the pipes (36). Instead, additional tees (122) are provided near each header (32) and (34) that are connected to the adjacent rows of tees (102). These tees (122) are then also connected to 900 elbows (124) that will provide connections to the pipes (36) in those locations where connections are not provided to the headers (32) and (34). Again, the additional tees (122) and 90° elbows (124) near the upper header (34) are essentially the mirror images of the additional tees (122) and 90° elbows (124) near the lower header (32).

A connection is not provided directly from the lower header (32) to the lower end of the pipe (36) that is located where the tee (108) is used for connection to the drain valve (118). To provide this connection, two additional tees (126) are required near the lower header (32) that are connected to the tees (102) each side of this location. These two tees (126) are then connected to each end of a further tee (128) that provides a connection to the lower end of the pipe (36) in that location. The upper end of this pipe (36) is already provided with a tee (102) connection to the upper header (34) without special treatment.

Figure 11:
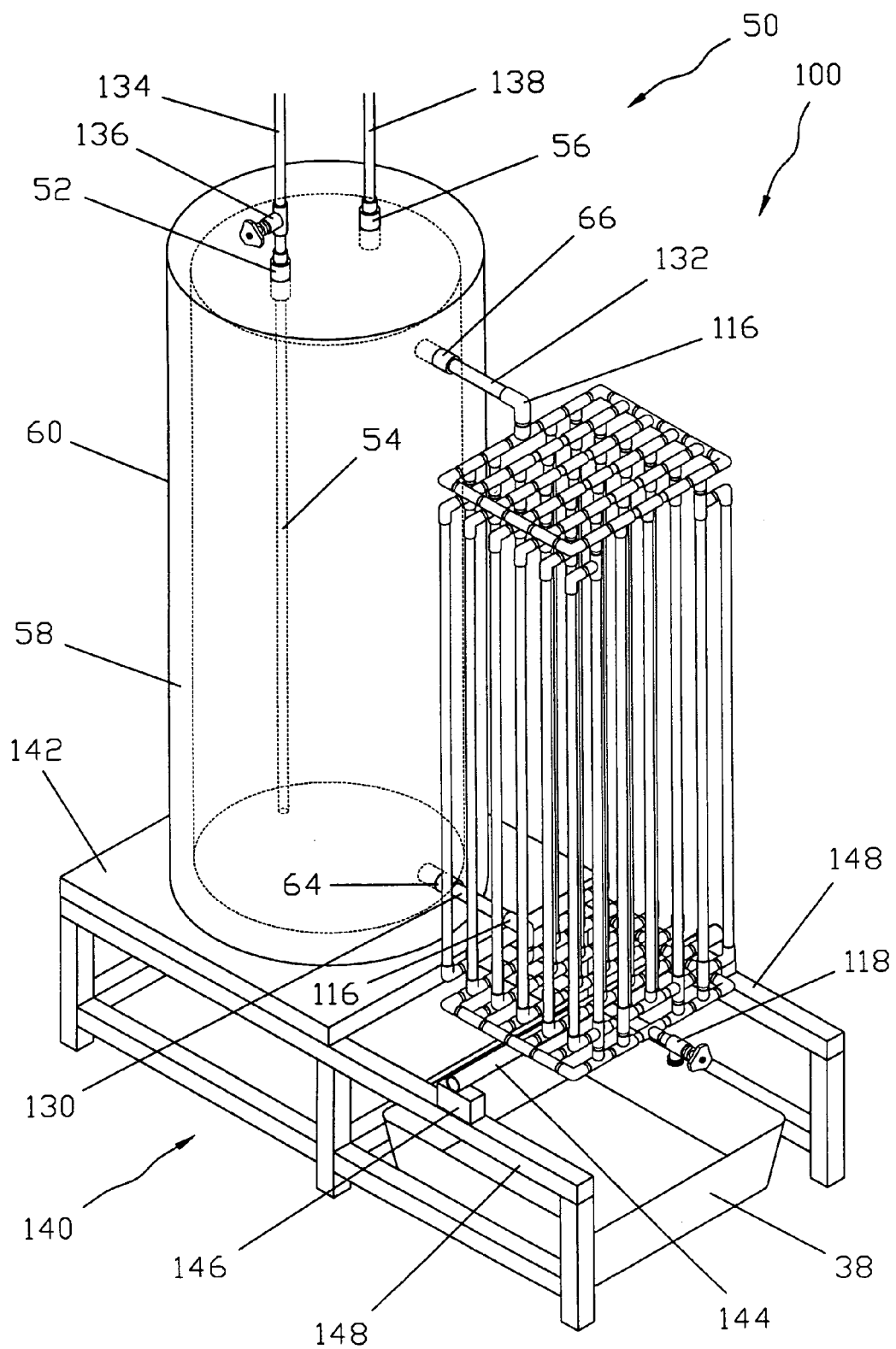
FIG. 11 shows a perspective view of a 41 pipe parallel type heat-exchanger and temperate water tank with side entry connections.
Figure 12:
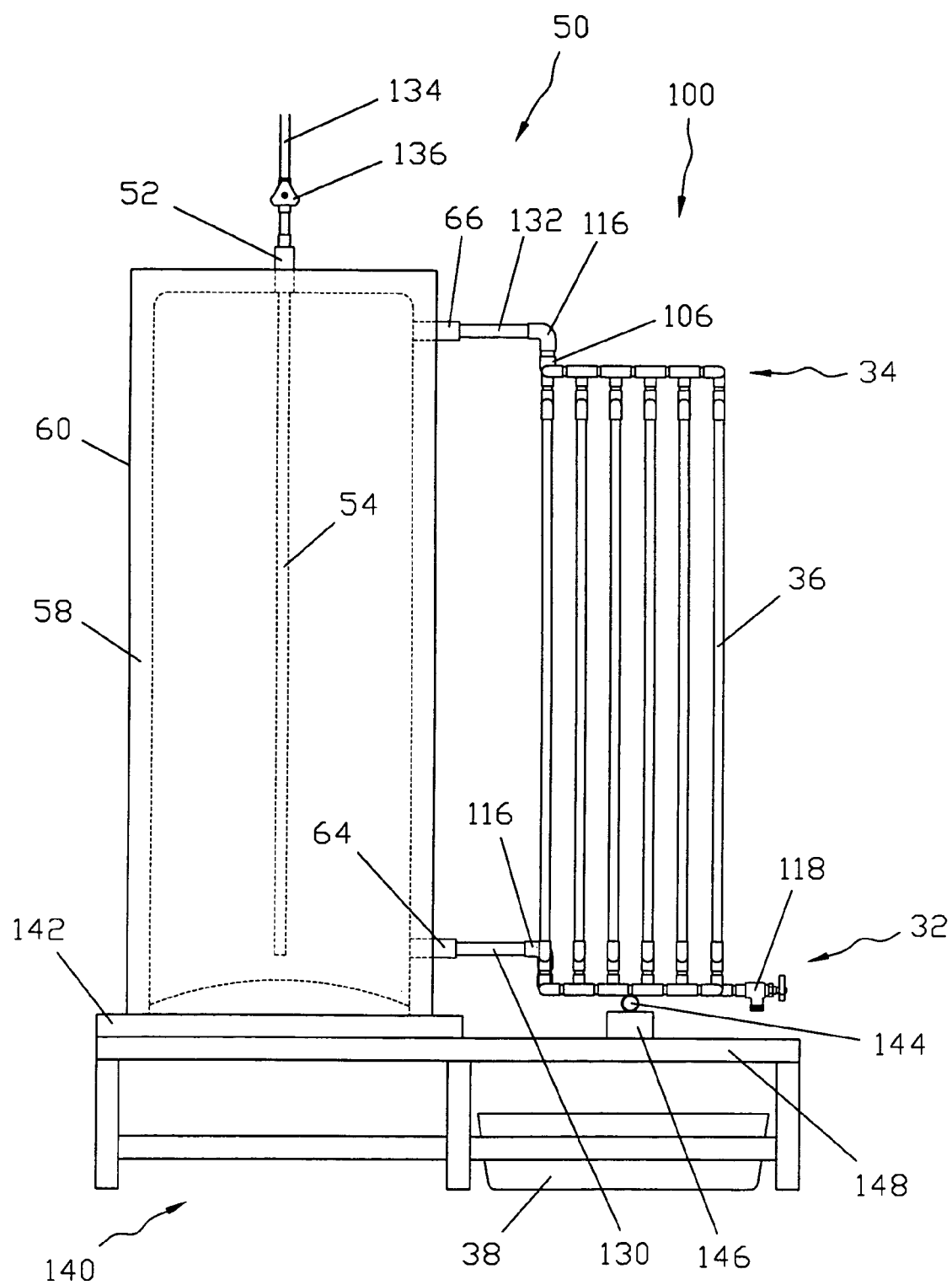
FIG. 12 shows a side view of a 41 pipe parallel type heat-exchanger and temperate water tank with side entry connections.
Figure 13:
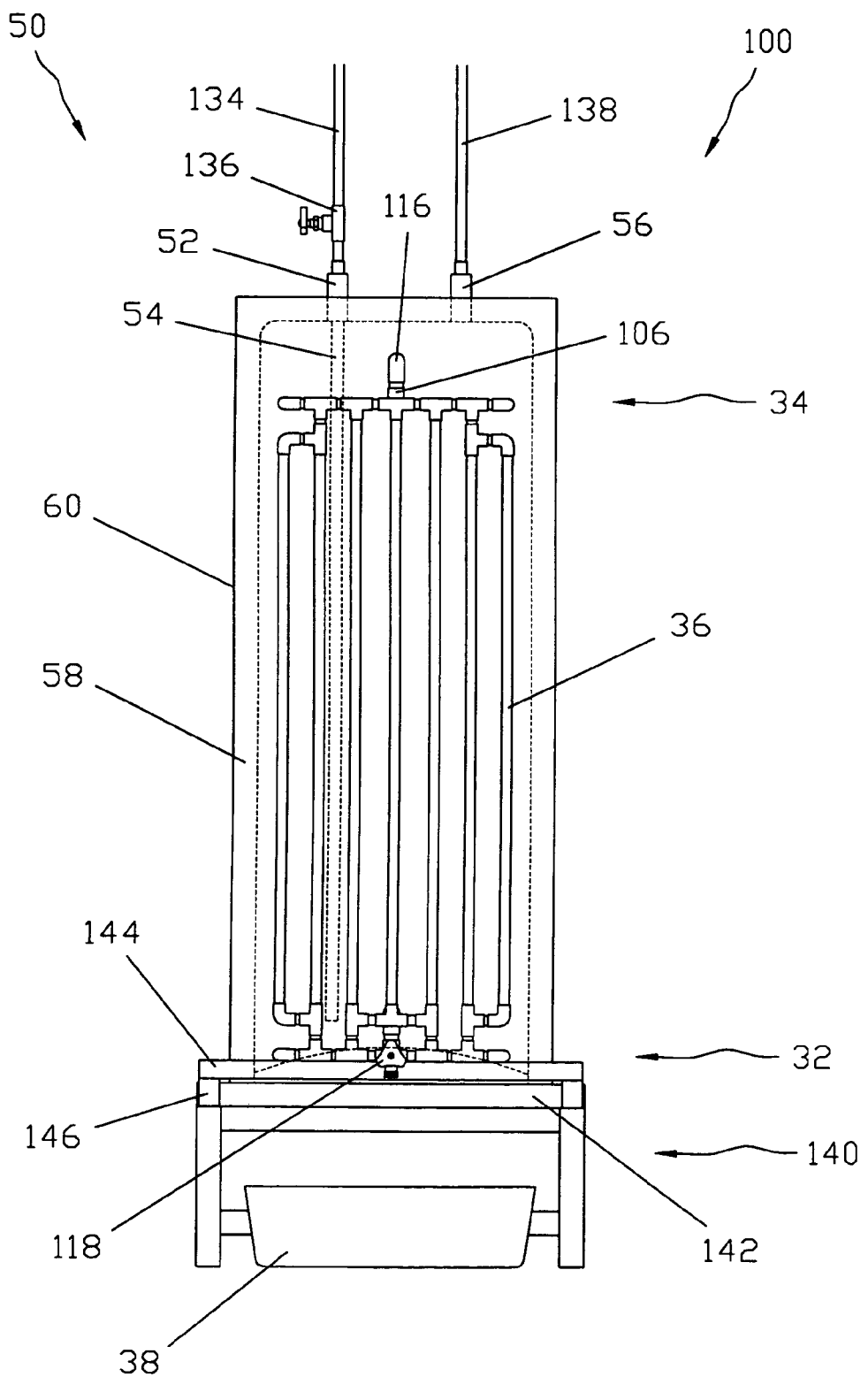
FIG. 13 shows a front view of a 41 pipe parallel type heat-exchanger and temperate water tank with side entry connections.
Figure 14:
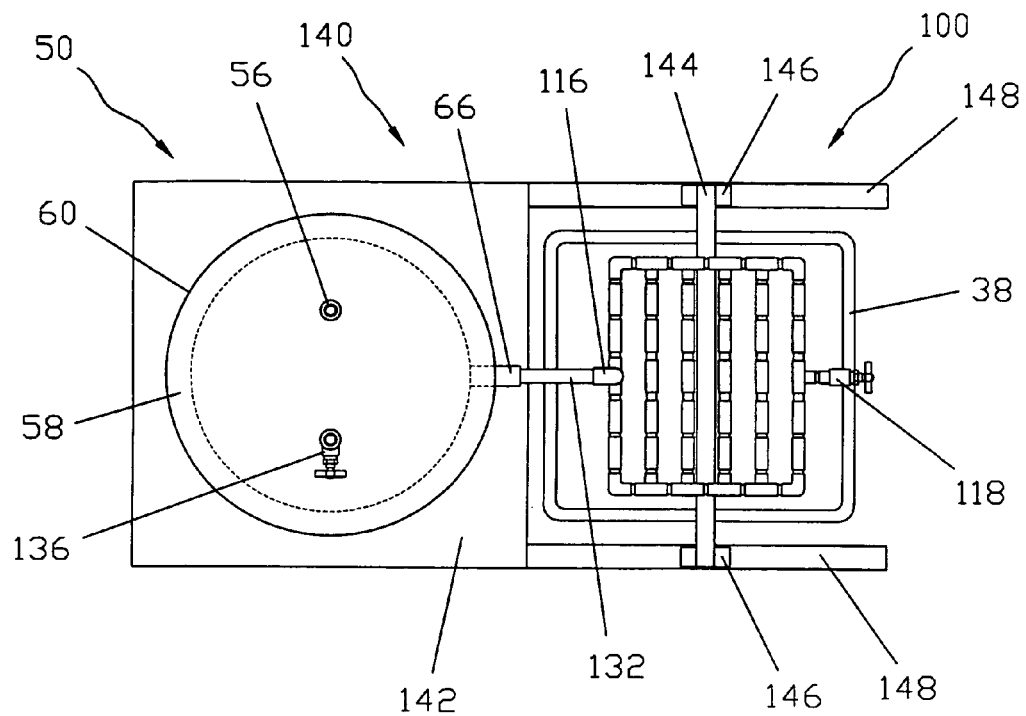
FIG. 14 shows a top view of a 41 pipe parallel type heat-exchanger and temperate water tank with side entry connections.

Referring to FIG. 11, which shows a perspective view, and also to FIGS. 12,13 and 14, which show the side view, front view, and top view, of the 41 pipe parallel type heat-exchanger (100) and temperate water tank (50) with side entry connections (64) and (66). Here the just described heat exchanger (100) is shown connected directly to the temperate water tank (50) by means of a lower horizontal pipe (130) that extends from the 90° elbow (116) of the lower header (32) to the lower side entry (64) connection of the tank (50), and also by means of an upper horizontal pipe (132) that extends from the 90° elbow (116) of the upper header (34) to the upper side entry (66) connection of the tank (50).

The cold water supply pipe (134) from the main (12) is connected, via a shut-off valve (136), to the input (52) connection at the top of the tank (50), which then connects to an internal pipe (54) that extends preferably to near the bottom of the tank, so that the cold water is released near the bottom of the tank (50). The temperate water output pipe (138) is also connected to the top of the tank (50), where it can draw temperate water from the top area of the tank (50) for supplying the plumbing system (28) of the home, via pipe (22).

The temperate water tank may be covered with insulation (58), and contained in an outer casing that provides a reliable vapor barrier (60), to protect the tank itself (50) from any condensation or corrosion that may otherwise occur. The external connecting pipes (130, 132, 134 and 138) may also be covered with insulation and jacketed with vapor barriers, but for reasons of clarity, this is not shown in the illustrations. The same applies to the connections (52, 56, 64 and 66), and also to the shut-off valve (136).

The temperate water tank preferably sits on the platform (142) of a stand (140) in order to raise it above the floor. Raising it above the floor permits a drip tray (38) to be placed underneath the heat exchanger (100) to collect any condensation that may form on the pipes of the heat exchanger (100). The drip tray (38) may be emptied manually when necessary, or it can be connected via a drainage pipe to the nearest floor drain. The weight of the heat exchanger (100) is carried by a support bar or pipe (144) that spans the width of the stand (140) and rests on riser blocks (146) that are placed onto each arm (148) of the stand (140). The drain valve (118) can be used to provide temperate or cold water for convenience use, or for draining both the heat exchanger (100) and the temperate water tank (50).

Figure 15:
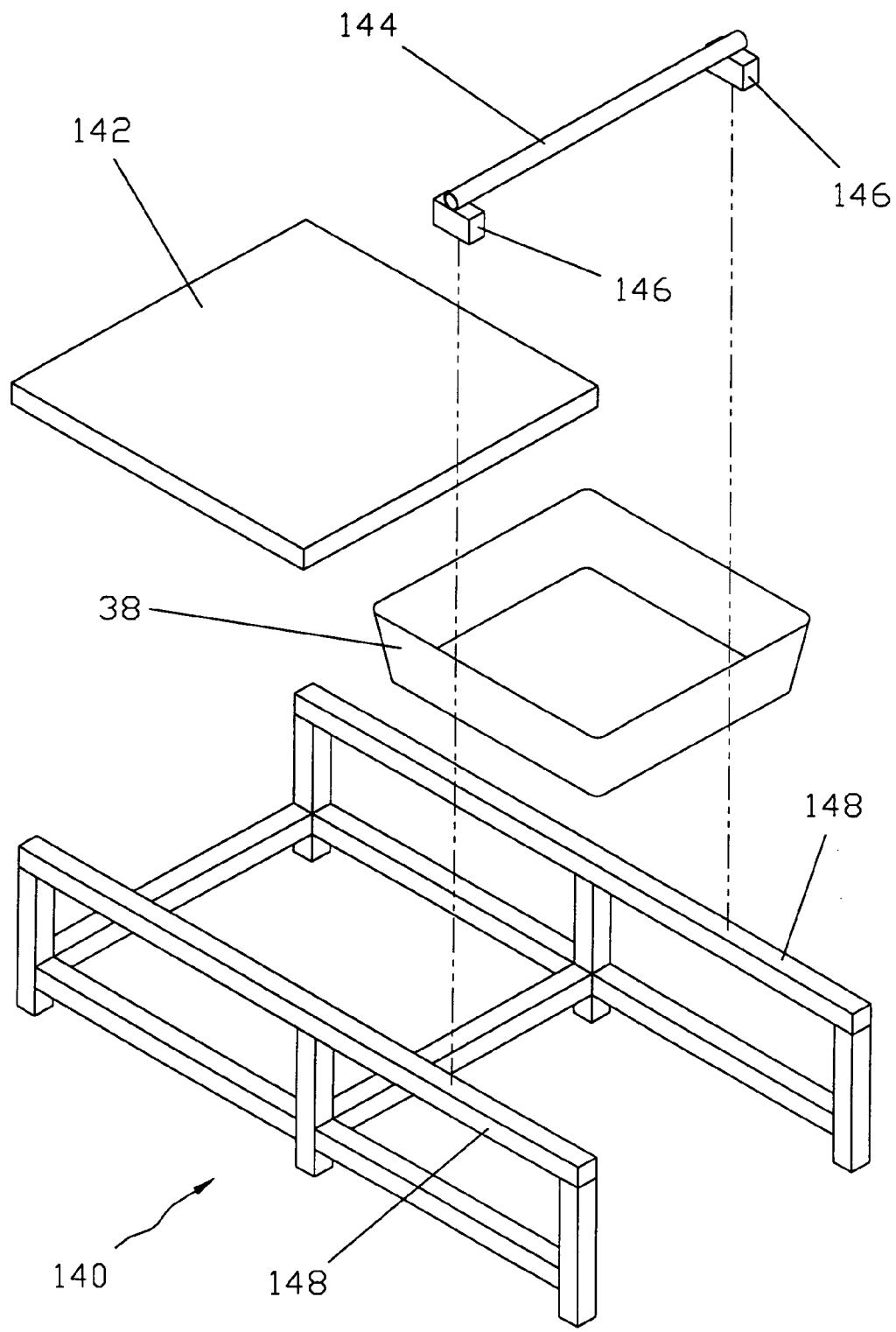
FIG. 15 shows perspective views of a stand, a drip tray, and a support bar, for a 41 pipe parallel type heat-exchanger and a temperate water tank.

The stand (140) itself can be of any suitable size or configuration, so long as it is stable and is made strong enough to carry the combined weight of the heat exchanger (100) and the temperate water tank (50) or (80) when they are full of water. Details of a basic stand (140) that would be suitable are shown in FIG. 15. Cross-bracings may be added for strength, if necessary. Also shown are details of the heat exchanger support bar or pipe (144) that spans the width of the stand (140), as well as details of the two riser blocks (146). The drip tray (38) may also be any suitable shape or size.

Figure 19:
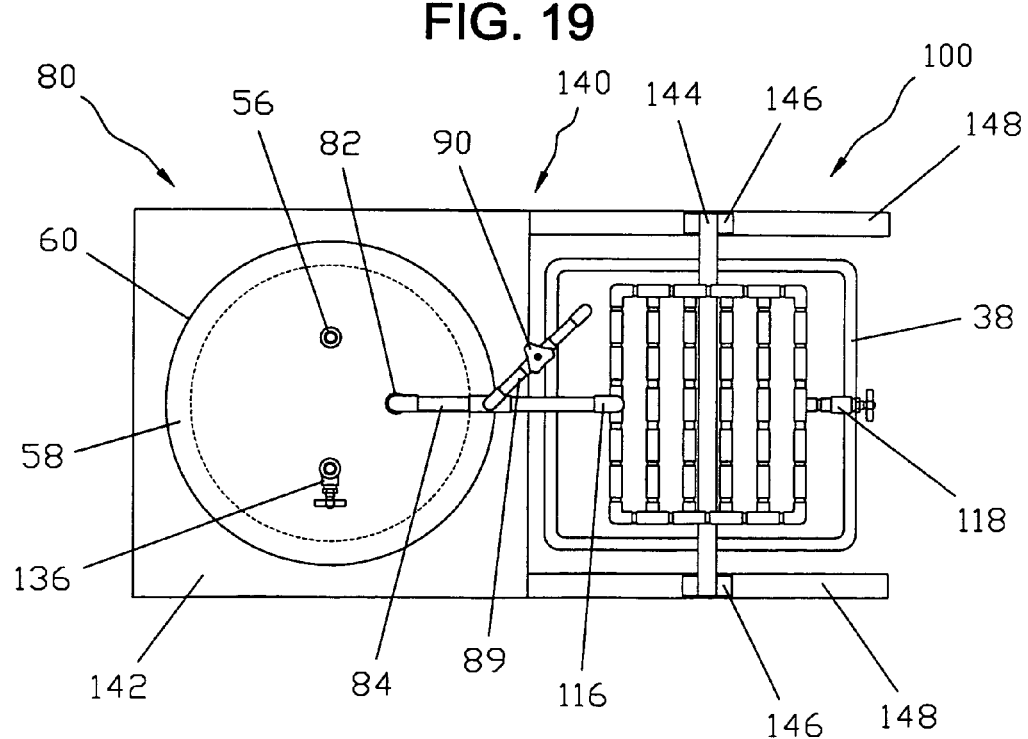
FIG. 19 shows a top view of a 41 pipe parallel type heat-exchanger and temperate water tank with side and top entry connections
Figure 16:
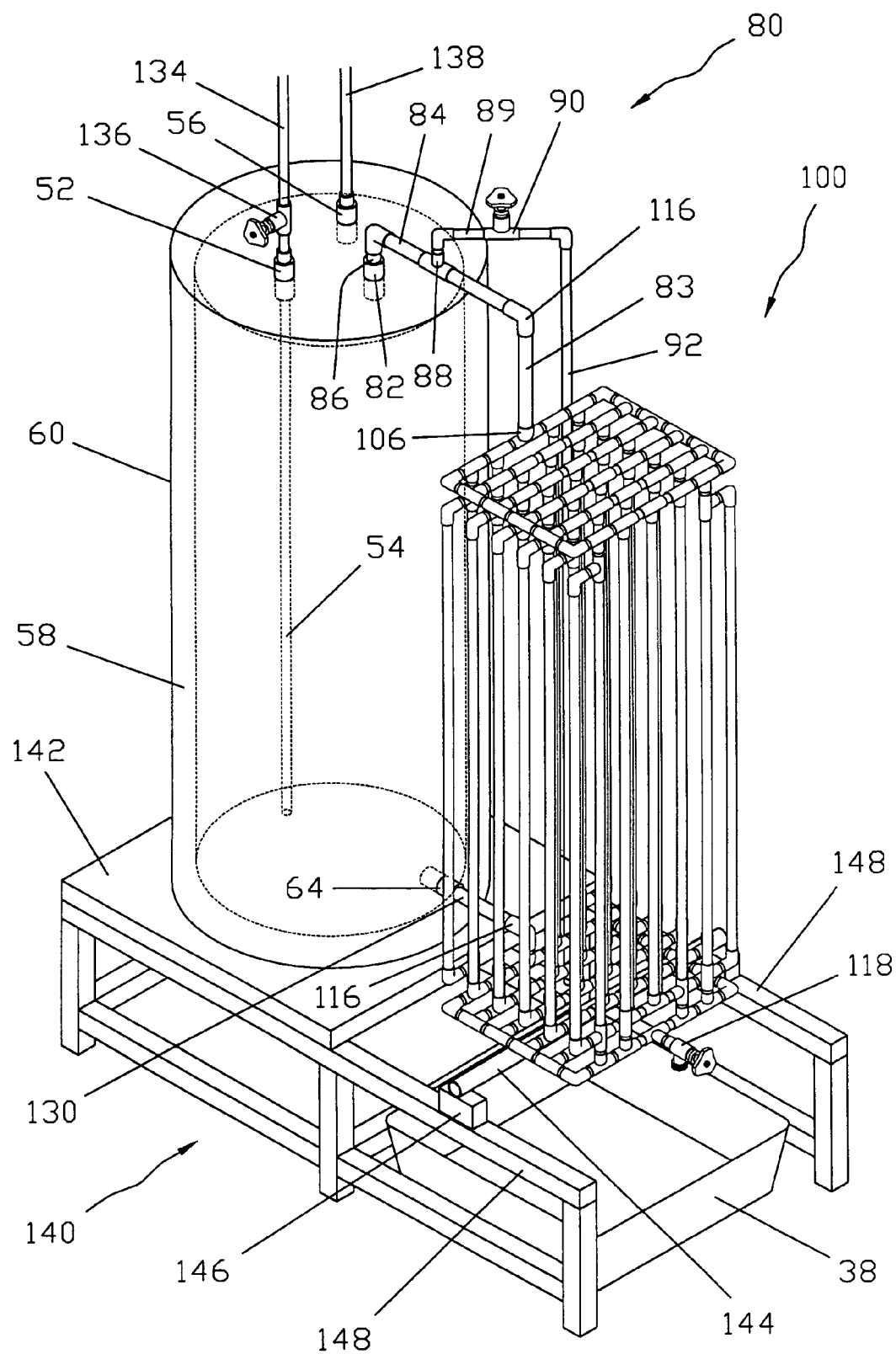
FIG. 16 shows a perspective view of a 41 pipe parallel type heat-exchanger and temperate water tank with side and top entry connections.
Figure 17:
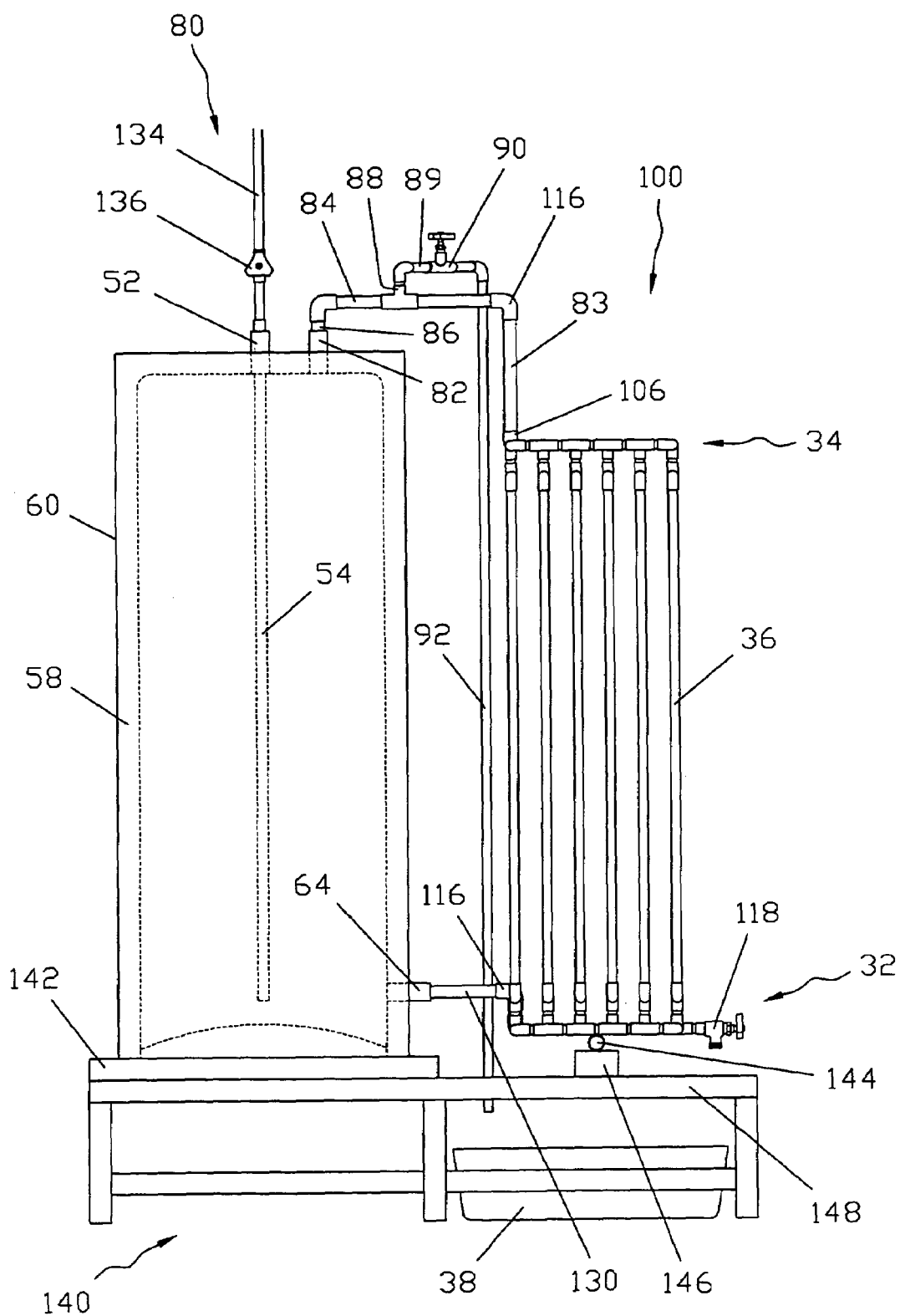
FIG. 17 shows a side view of a 41 pipe parallel type heat-exchanger and temperate water tank with side and top entry connections.
Figure 18:
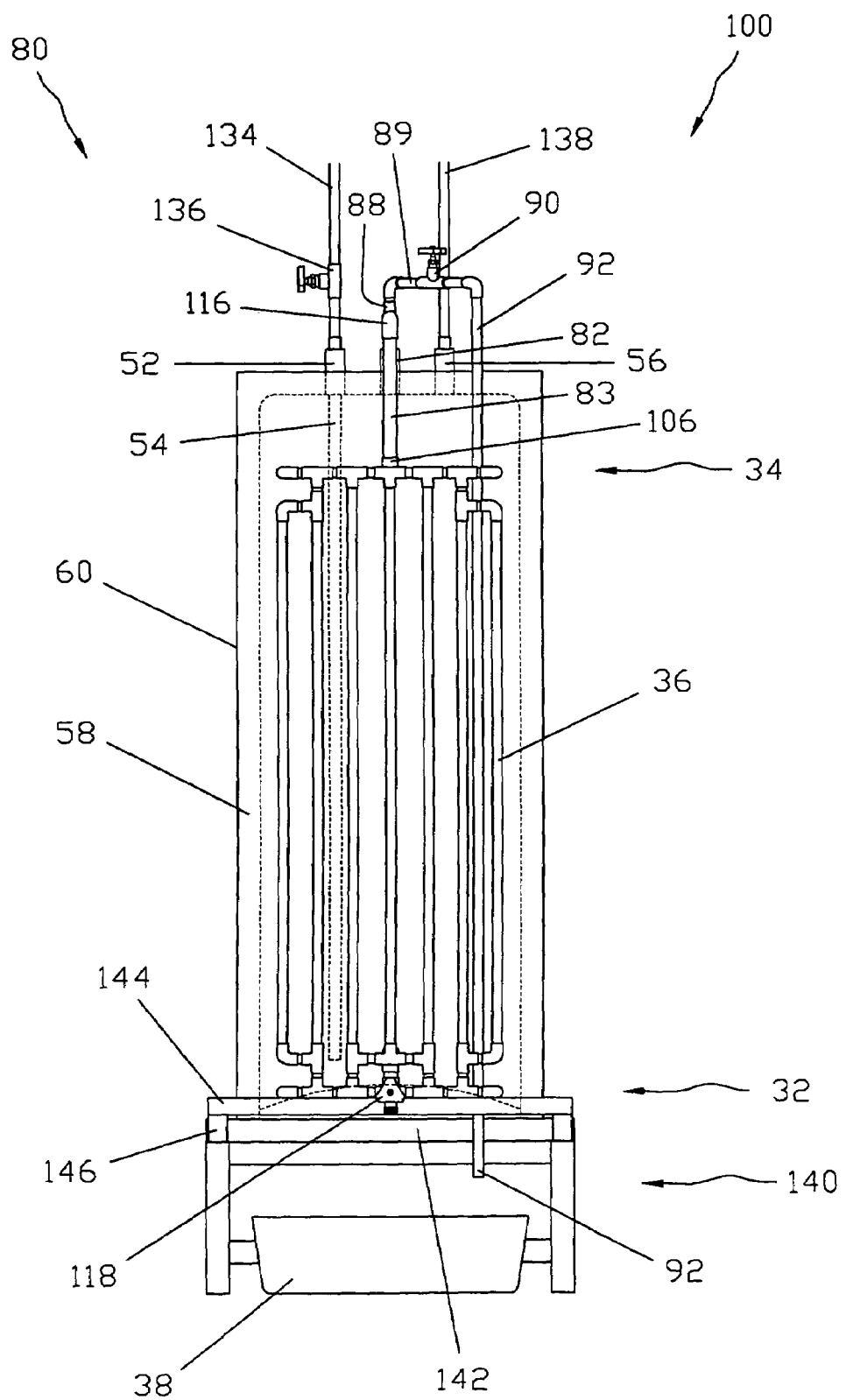
FIG. 18 shows a front view of a 41 pipe parallel type heat-exchanger and temperate water tank with side and top entry connections.

Referring to FIG. 16, which shows a perspective view, and also to FIGS. 17,18 and 19, which show the side view, front view, and top view, of the 41 pipe parallel type heat-exchanger (100) and temperate water tank (80) with a side entry connection (64) and a top entry connection (82). Most of the features for this version of the temperate water tank (80) can be similar to those already described for the temperate water tank (50) with side entry connections (64) and (66) for the heat exchanger (100), and only those features that are different will be described here.

In this case, the lower header (32) is still connected to the temperate water tank (80) by means of a lower horizontal pipe (130) that extends from the 90° elbow (116) of the lower header (32) to the lower entry (64) connection on the side of the tank (80). However, the 90° elbow (116) of he upper header (34) has an uninsulated extension pipe (83) between it and its tee (106) connection. The 90° elbow (116) is then connected to the temperate water tank (80) by means of an upper horizontal pipe (84) and then, via a 90° elbow, to a vertical pipe (86) that extends downwards into the top entry (82) connection of the tank (80).

A tee (88) connection extends upwards from the upper horizontal pipe (84) and connects, via a 90° elbow, to horizontal pipe (89) and bleeder valve (90). The bleeder valve (90) then connects, via a second 90° elbow, to a discharge pipe (92) that extends downwards into the drip tray (38). Once again, all external connecting pipes and fittings (84, 86, 88, 89, 90 and 130) may be well insulated and jacketed with vapor barriers, but for reasons of clarity, this is not shown in the illustrations. All other features are the same for both versions.

Installation Options for Temperate Water Tanks

For a first option as representationally shown in FIG. 20, the temperate water tank (10, 50 or 80) can be operated as a stand alone unit in the basement of a home (13), where the heat exchanger (30) would function in conjunction with the ambient air of the basement (37a), and draw its heat energy from the ambient air of the basement (37a). During the summer, this would help to cool the ambient air temperature in the basement (37a), and also help to lower the humidity on hot and humid days. During the winter, unless bypassed, it would continue to draw its heat energy from the ambient air temperature of the basement (37a), which would have to be made up for by the heating system of the home (13).

For a second option, as representationally shown in FIG. 21, the temperate water tank (10, 50 or 80) can be operated as a stand alone unit in any convenient location in the living area (37b) of the home (13), where the heat exchanger (30) would operate in conjunction with the ambient air of the living area (37b), and draw its heat energy from the ambient air of the living area (37b). During the summer, this would help to cool the ambient air temperature of the living area (37b), which is typically much hotter than the basement (37a), and also help to lower the much higher humidity level in the living area (37b) on humid days. During the winter, unless bypassed, it would continue to draw its heat energy from the ambient air temperature of the living area (37b), and this would have to be made up for by the heating system of the home (13).

For a third option, as representationally shown in FIG. 22, the temperate water tank (10, 50 or 80) can be operated as a stand alone unit in the basement (37a), but with the heat exchanger (30) connected to ducting (160) from the living area (37b) of the home (13). Here, the thermostatically controlled fan (26) would suck ambient air from a register (161) high up in the living area (37b), so that the heat exchanger (30) would operate in conjunction with the hotter ambient air of the living area (37b), and draw its heat energy from that hotter ambient air of the living area (37b). The cooled ambient air in the basement (37a) would then be returned to the living area (37b) through a cool air register (162) located between the basement (37a) and the living area (37b).

During the summer, this would help to cool the ambient air temperature in the living area (37b) of the home (13), and also help to lower the much higher humidity level of the living area (37b) on humid days. During the winter, unless bypassed or the fan (26) has been turned off, the heat exchanger (30) would continue to draw its heat energy from the ambient air temperature of the living area (37b), which would have to be made up for by the heating system of the home.

Figure 23:
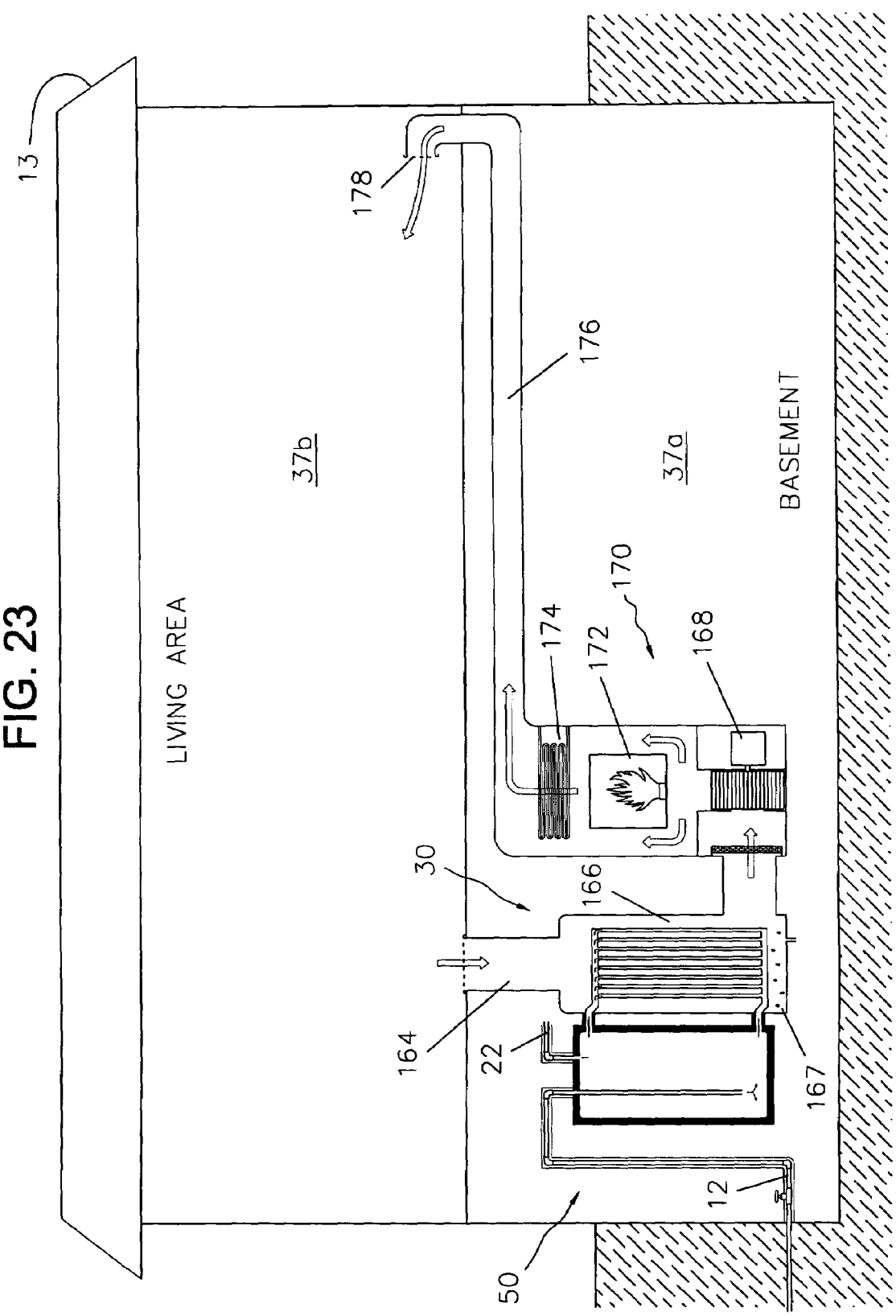
FIG. 23 shows a representational view of a parallel type heat-exchanger and temperate water tank with side entry connections located in home installation option 4.

For option 4, as representationally shown in FIG. 23, the temperate water tank (10, 50 or 80) can be located as a stand alone unit in the basement (37a), but with the heat exchanger (30) being contained inside a housing (166) that would be connected in series with the return duct for a hot air furnace and/or central air-conditioning unit (170). In this case, the return air from the living area (37b) would be drawn first through the heat exchanger (30) by means of the blower fan (168) that is located inside of the furnace and/or central air-conditioning unit (170), before entering the input of the furnace and/or central air-conditioning unit (170).

The heat exchanger (30) would draw its heat energy from the return air, and in so doing it would pre-cool the return air, as well as remove some of the humidity from the return air on days that are humid. This pre-cooled return air would then be either heated during winter by the furnace (172), or extra cooled during summer by the central air-conditioner (174). The heated or cooled air output from the furnace and/or central air-conditioning unit (170) would then be distributed throughout the home via the normal ducting (176) to the various registers (178). Any condensate from the heat exchanger (30) would be collected in the drip tray area (167) underneath the heat exchanger (30), which could then be disposed of through a pipe to the nearest floor drain.

During the Summer, the pre-cooled air from the heat exchanger (30) going into the furnace and/or central air-conditioning unit (170) would effectively increase the efficiency of the central air conditioner (174) because the cooling coils of the central air conditioner (174) would be enabled to lower the temperature of the pre-cooled return air to a colder temperature than would have been the case if the return air was not pre-cooled. Additionally, if the return air is made colder by this means, it will also have more of its humidity removed by the central air-conditioner (174) than would occur without the air being pre-cooled by the heat exchanger (30).

During the Winter, unless bypassed, the heat exchanger (30) of the temperate water tank (10, 50 or 80) would continue to draw its heat energy from the return air to a combined furnace and central air-conditioning unit (170). The combined unit (170) includes an air conditioner (174) and a furnace (172). The furnace would have to make up the heat that was consumed by the heating of the water in the temperate water supply system (25, 31 or 33). However, this may have a negligible effect on the heating system of the home (13) because if the return air is made cooler by the heat exchanger (30) before it enters the furnace (172) of the combined furnace and/or central air-conditioning unit (170), then there will be a greater temperature difference between the cooled return air and the very hot heat exchanger surface of the furnace (172), which could mean increased efficiency of the furnace (172) because more heat energy would transferred to the cooled return air, instead of its being lost up the chimney.

Differential Thermostat for Fan Control

In embodiments of the temperate water supply system (25, 31, 33) that include the optional fan (26), it is desirable to have the optional fan (26) operate only when the temperature of the water contained inside the pipes (36) of the heat exchanger (30) is lower than the temperature of the ambient air (24) around the outside of the pipes (36), and to have the fan (26) not operate when the temperature of water contained inside the pipes (36) of the heat exchanger (30) is the same or higher than the temperature of the ambient air (24) around the outside of the pipes (36).

Such control can be provided by means of a differential thermostat (39), which would have two sensors S1 and S2. One sensor (e.g. S1) would be located to measure the temperature of the ambient air (24) around the outside of the pipes (36), and the other sensor (e.g. S2) would be located to measure the temperature of the water inside the pipes (36).

Figure 24:
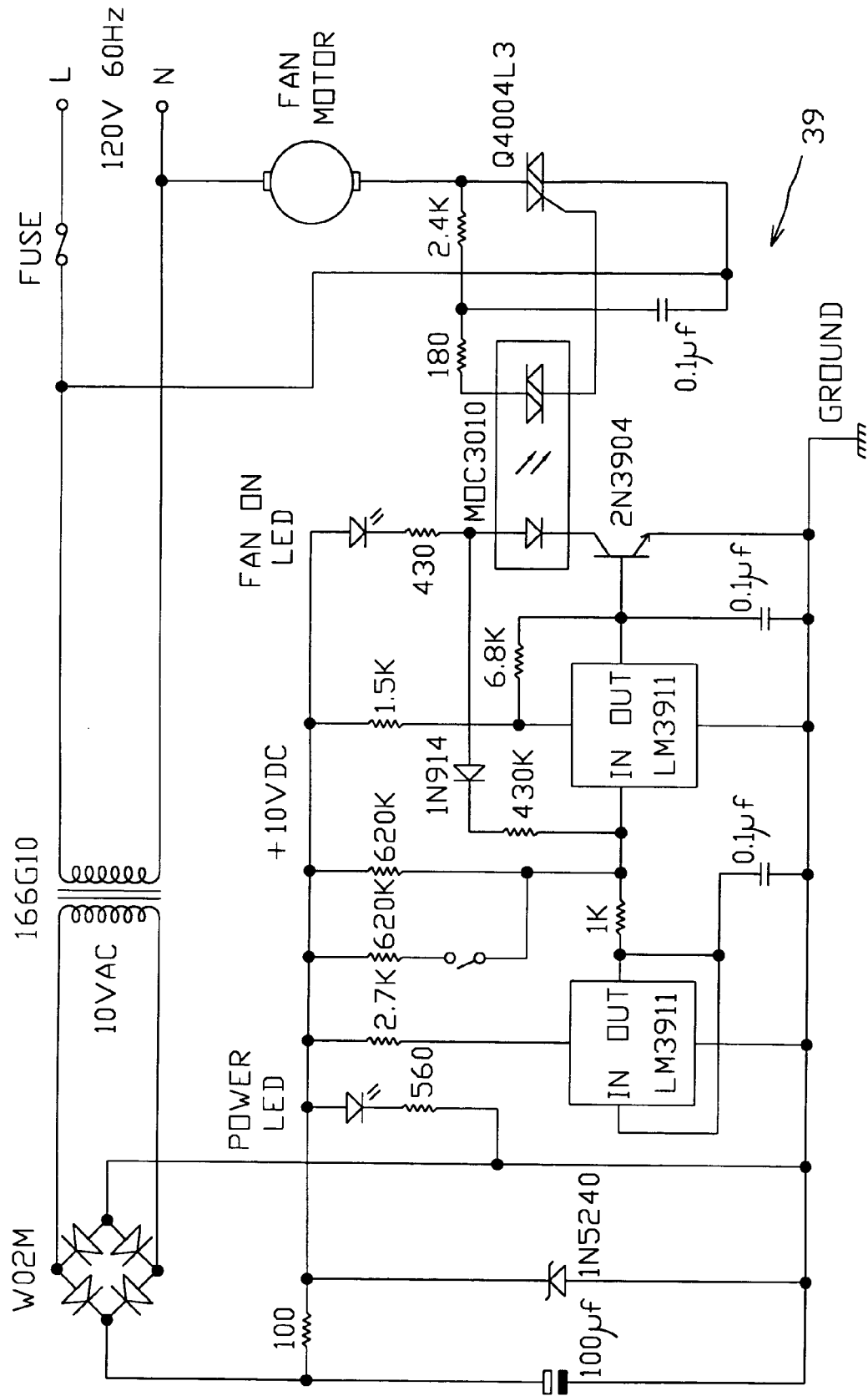
FIG. 24 shows the schematic diagram of a suggested differential thermostat for controlling a fan for the heat exchanger of a temperate water tank.
Figure 25:
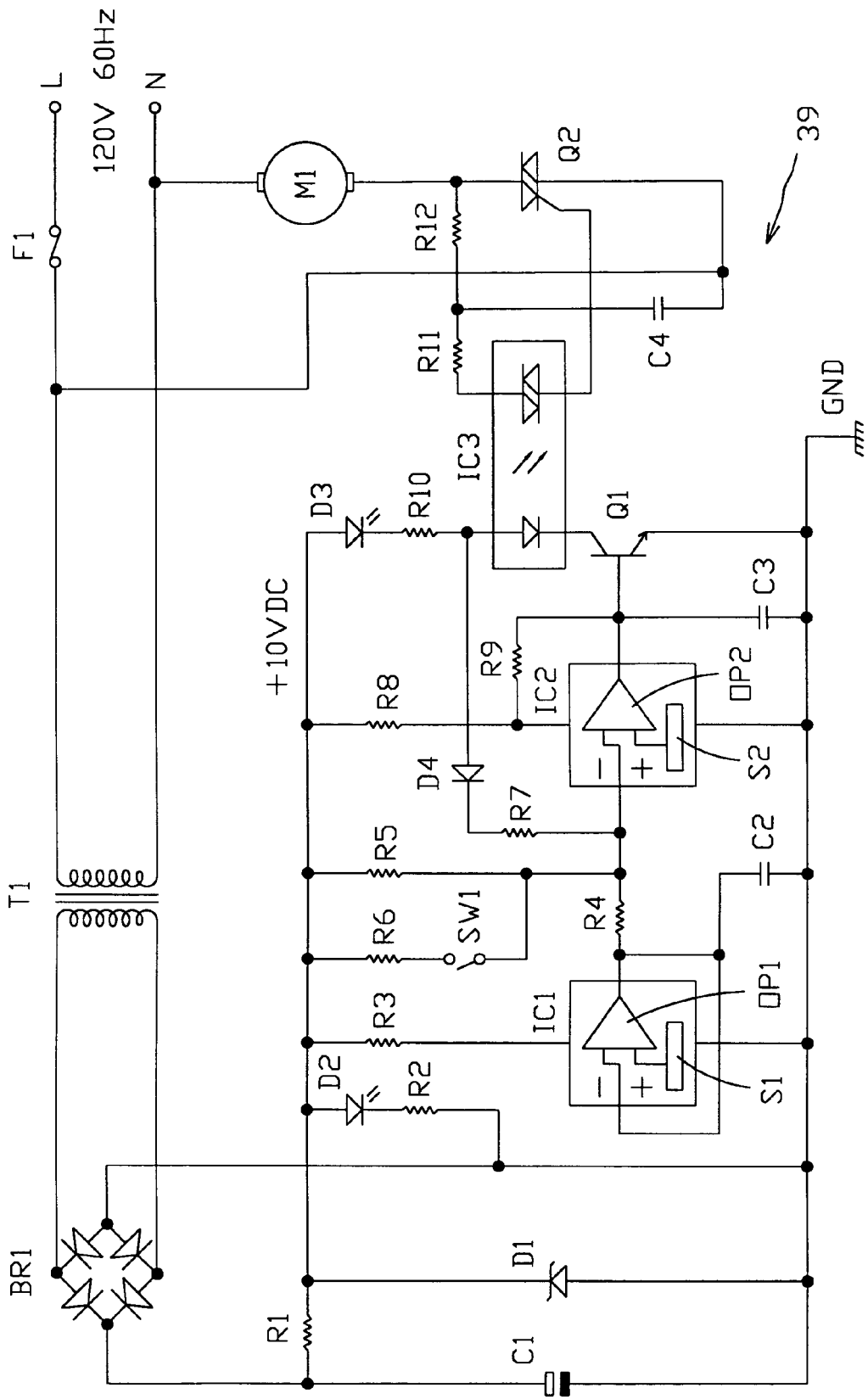
FIG. 25 shows an analyzed version of the schematic diagram shown in FIG. 24.

Reference is made FIGS. 24 and 25, which show a schematic diagram of an exemplary differential thermostat that would be suitable for controlling the heat exchanger fan (26). FIG. 24 shows a schematic diagram that provides exemplary values for the electrical properties of the components of the differential thermostat (39). FIG. 25 shows the same schematic diagram as FIG. 24, except in FIG. 25, the values of the electrical properties of the components are replaced with variables. In the diagrams, standard electrical and electronic components are used, all of which can be enclosed inside of a suitable case, but with the two temperature transducers IC1 and IC2 being located away from the unit. Each temperature transducer IC1 and IC2 is connected to the unit by means of four conductor tables.

Referring to FIG. 25, the function of the transformer T1, the rectifying circuit BR1, the capacitor C1, the resistor R1 and the diode D1 are solely to provide +10 volts DC, with reference to ground, for powering the electronic components. These components are, in effect, a voltage regulator for the thermostat (39). It will be appreciated that any suitable means of voltage regulation may be provided for the thermostat (39). Light emitting diode D2 in conjunction with resister R2 illuminates when there is power to the unit. The two temperature transducers IC1 and IC2 each contain temperature sensors S1 and S2, which have voltage outputs that are inversely proportional to the temperature in degrees Celsius, at −10 mV/° C., with reference to ground. When the temperatures of IC1 and IC2 are the same, the sensor output voltages will also be the same.

The sensors S1 and S2 are internally connected to the positive inputs of operational amplifiers OP1 and OP2 that are inside IC1 and IC2. The inputs of IC1 and IC2 are the negative inputs of the internal operational amplifiers OP1 and OP2, and the outputs of IC1 and IC2 are the outputs of those operational amplifiers OP1 and OP2. The input of IC1 is connected externally to its output, so that its operational amplifier will function as a unity gain follower, and the output of IC1 will thus also be inversely proportional to the temperature sensed by sensor S1, again in degrees Celsius at −10 mV/° C. The input of IC2 is connected externally to the output of IC1, via R4, so that the negative input of the internal operational amplifier of IC2 will essentially always be equal to the voltage at the output of IC1 plus any voltage that may be developed across R4.

The operational amplifier inside IC2 operates as a comparator, so that, unless any voltage is developed across R4, the output of IC2 will switch from a low voltage to a high voltage whenever IC2 is at a colder temperature than IC1. Also, unless any voltage is developed across R4, the output of IC2 will switch from a high voltage to a low voltage whenever IC2 is at a warmer temperature than IC1. The output of IC2 is connected to the base of NPN transistor Q1, which will cause Q1 to turn on when the output of IC2 is at a high voltage, or to turn off when the output of IC2 is at a low voltage. The 1 mA of base current necessary to adequately turn on Q1 is supplied via the line containing R9 when the output of IC2 is at a high voltage.

When Q1 is turned on, it will allow current to pass through the infra-red emitting diode of the opto-isolator IC3, as well as through R10 and D3. The resister R10 limits this current to 15 mA, and the light emitting diode D3 illuminates to indicate that the differential thermostat unit is in the "on" cycle, and also that the controlled fan will be turned on. The detector triac driver inside IC3 is activated by being coupled to the infra-red emissions from the diode inside IC3. In this way, the opto-isolator IC3 isolates the electronic circuitry of the differential thermostat unit from the 120 volt 60 Hz supply. It will also be noted that the transformer T1 also serves to isolate the thermostat from the 120 volt 60 Hz supply.

When the detector triac driver inside IC3 is activated, it triggers the gate of the triac Q2, which turns on Q2, and hence provides power to operate the fan motor M1. The resistors R11 and R12 limit the gate current of Q2, and also, in conjunction with C4, enable the triac to properly control an inductive load, such as a fan motor.

As mentioned above, unless any voltage is developed across R4, the output of IC2 will turn on, and switch from a low voltage to a high voltage, whenever IC2 is at a colder temperature than IC1. Also, unless any voltage is developed across R4, the output of IC2 will turn off, and switch from a high voltage to a low voltage, whenever IC2 is at a warmer temperature than IC1. It may be desirable, however, to turn on the output of IC2 only when a selected temperature difference exists between the ambient air and the water in the heat exchanger, instead of turning on as soon as any temperature difference exists. For example, it may be desirable to require that the ambient air be at least 1° C. (1.8° F.) warmer than the water in the heat exchanger before the output of IC2 is turned on. In addition, it is necessary to control whether the output of IC2 is turned on or turned off when the selected threshold temperature difference is achieved.

In the exemplary embodiment, the output voltage of IC1 will vary according to the temperature of its internal sensor, ranging from +3.67 volts at 40° C. [104° F.] up to +4.03 volts at 4° C. [40° F.] in −10 mV/° C. steps, which, in the absence of any voltage being developed across R4, is also the voltage that is applied to the input of IC2. However, if +10 mV could be made to develop across R4, then the voltage that is applied to the input of IC2 would range from +3.68 volts at 40° C. [104° F.] up to +4.04 volts at 4° C. [40° F.], also in −10 mV/° C. steps. This would have the effect of turning IC2 either on or off when IC2 is 1° C. [1.8° F.] colder than IC1, instead of when they are at equal temperatures. Also, if +20 mV could be made to develop across R4, then the voltage that is applied to the input of IC2 would range from +3.69 volts at 40° C. [104° F.] up to +4.05 volts at 4° C. [40° F.], and IC2 would turn either on or off when IC2 is 2° C. [3.6° F.] colder than IC1.

Resistor R5 enables the necessary +10 mV to be developed across R4, and R6 enables an additional +10 mV to be developed across R4 when the switch SW1 is closed. However, IC2 would still not know whether it should turn on or turn off at this new changeover temperature. This problem is solved by R7, which causes an extra +10 mV to be developed across R4, but only when IC2, and hence Q1, are turned off, not when IC2 and Q1 are turned on. Diode D4 ensures that R7 has no affect on R4 when IC2 and Q1 are turned on.

This means that, if switch SW1 is turned off, the differential thermostat will only turn on the fan (26) when the temperature of IC2 is at least 2° C. [3.6° F.] colder than IC1, and it will only turn the fan (26) off again when IC2 has warmed so that it is only 1° C. [1.8° F.] colder than IC1. Also, if switch SW1 is turned on, the differential thermostat will only turn on the fan (26) when the temperature of IC2 is at least 3° C. [5.4° F.] colder than IC1, and it will only turn the fan (26) off again when IC2 has warmed so that it is only 2° C. [3.6° F.] colder than IC1. This ensures that IC2 will always know when to turn on, and when to turn off.

The resistors R3 and R8 serve to limit the supply currents for IC1 and IC2 to be slightly more than 1 mA, and the capacitors C2 and C3 provide decoupling for the outputs of IC1 and IC2.

Figure 26A:
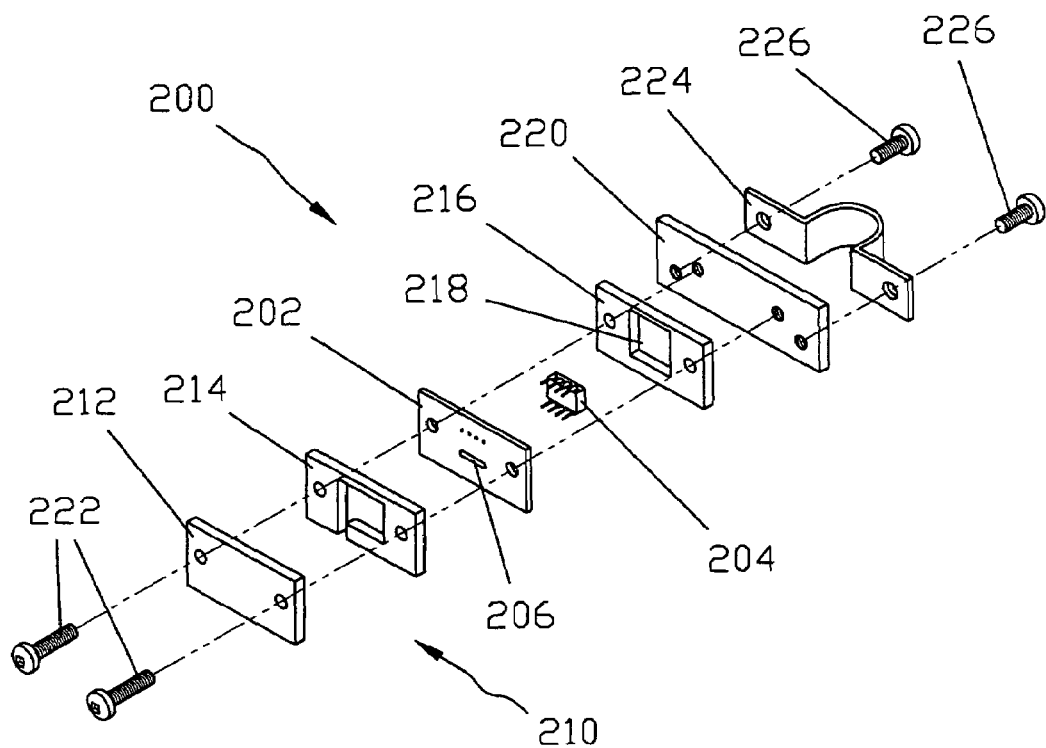
FIGS. 26A, 26B and 26C show a suggested method for the installation and the mounting of the heat sensors for controlling a heat exchanger fan for a temperate water tank.
Figure 26B:
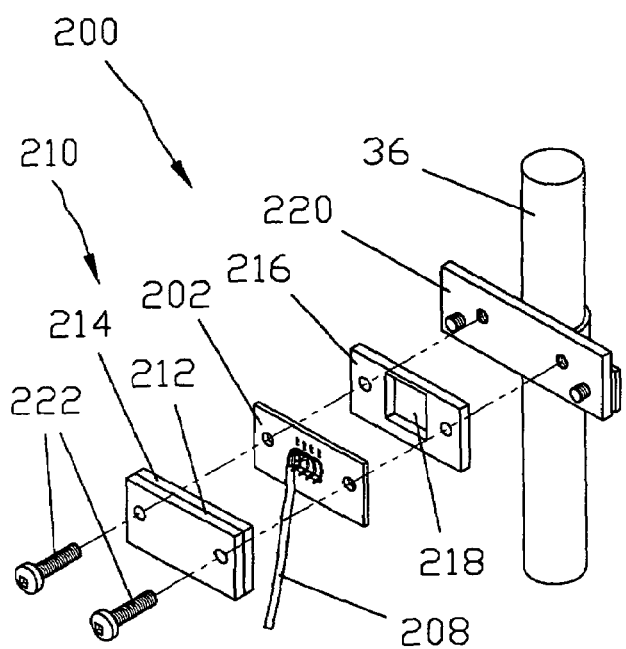
Figure 26C:
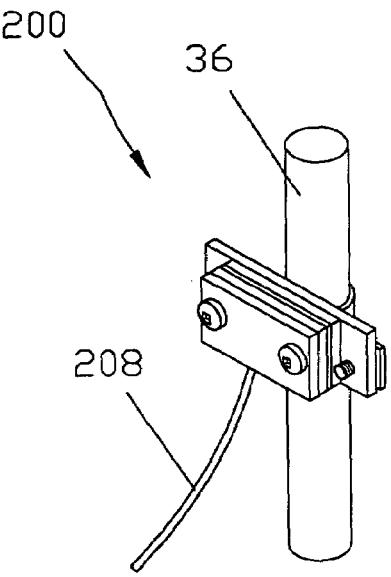

A suggested means of physical attachment for the temperature transducer IC2 onto the heat exchanger (30) is illustrated in FIGS. 26A, 26B and 26C. The heat sensor assembly (200) includes a copper mounting plate (202) that has holes for insertion and soldering of the four inactive pins of IC2 (204) thereto. The four active pins of IC2 (204) pass through a slot (206) in the copper mounting plate, and are insulated from the copper mounting plate (202). The four active pins of IC2 (204) are soldered instead to the four wires of the cable (208) to provide its connection to the rest of the differential thermostat unit.

A plastic cover assembly (210) consisting of two parts (212) and (214) that are glued together, then abuts the outer surface of the copper mounting plate (202) to cover and protect the soldered connections of IC2 (204). Alternatively, the plastic cover assembly (210) could be molded as a single unit. The brass spacer plate (216) is the same thickness as the body of IC2, and includes a rectangular hole (218) to accommodate the body of IC2 (204). The plastic cover assembly (210), the copper mounting plate (202), and the brass spacer plate (216), are fastened onto the brass clamping plate (220) by means of brass screws (222).

The heat sensor assembly (200) containing IC2 is then attached near to the bottom of the heat exchanger (30) and fastened onto one of the pipes (36) by means of the copper pipe clip (224) and the two brass screws (226) that are screwed into the brass clamping plate (220). All of the metal parts of the heat sensor assembly (200) may be made of either copper or brass due to their good thermal conductivity of heat and cold, and also to avoid any rust or corrosion that could be caused by condensation from the heat exchanger (30).

The physical attachment method for the temperature transducer IC1 would be similar to that of the temperature transducer IC2, except that, instead of having the heat sensor assembly (200) attached to one of the pipes (36) of the heat exchanger (30) by means of a pipe clip (224), the heat sensor assembly (200) containing IC1 would either be attached to some surface that is in contact with the ambient air (24) around the heat exchanger (30), or suspended in some way so that it will itself have direct contact with the ambient air (24) around the heat exchanger (30). Preferably, the heat sensor assembly (200) containing IC1 is not directly attached to the case that contains the electronics for the differential thermostat unit, because any heat that is generated from that unit may interfere with the accuracy of IC1.

According to statistics, the average household (of 4 people) consumes about 300 cubic meters of water per year. Since one cubic meter of water weighs 1,000 kg [2,205 lb], this means that 300,000 kg [661,500 lb] of water is consumed by each household annually. Also, statistically, it has been found that 40% of this water is used during the Winter months, and 60% is used during the Summer months. For reasons of simplicity, the Spring and Fall months will be absorbed so that the year can be divided into two seasons instead of four, since either heating or air-conditioning is sometimes required all year round because the weather during the Spring and Fall months can sometimes be uncomfortably cool or uncomfortably warm, depending of course on the particular location of the home or residence. For the sake of the following energy calculations, it will be assumed that the two seasons (i.e. a season in which the home requires heating, and a season in which the home requires air conditioning), are of equal length at 182 days.

Although it may vary somewhat, depending upon the season and geographical location, the average temperature of cold water (supplied by the municipality) is generally about 10° C. [50° F.]. Generally, for most people, this 10° C. [50° F.] water is too cold for washing or for cleaning teeth, and so it is common for people to also turn on the hot water tap in order to raise the temperature of the 10° C. [50° F.] water up to a more comfortable temperature, such as, for example, 21° C. [70° F.] or higher. If temperate water, made using the temperate water supply system of the present invention, was available that was already at or near the desired temperature, such as 21° C. [70° F.], energy would be saved by the reduction of consumption of hot water. It is possible that some users would continue to run hot water to heat up the temperate water to a temperature that is more comfortable for them. In such instances, they would still be consuming hot water, however, their consumption would be far reduced, since the hot water is being mixed with temperate water instead of cold water.

During winter, the proposed temperate water tank (10) would provide this temperate 21° C. [70° F.] water, at little or no cost, by transferring heat from the typically 21° C. [70° F.] ambient air inside the home over to the cold water. Since 40% of annual water consumption occurs during the Winter months, it means that 120,000 kg [264,600 lb] of water would have to be heated in this manner in order to raise its temperature by 11° C. [ie. from 1° C. up to 21° C.]. The energy that is required to do this would be 11 kilogram-calories for each kg of water [1 kilogram-calorie heats 1 kg of water by 1° C.], therefore the energy required to heat 120,000 kg of water would be 1,320,000 kilogram-calories. Also, since a kilogram-calorie is equal to 4,186 joules, the total energy would be 5,525,520,000 joules, or 1,535 kWh for the season [note that 1 kWh=3,600,000 joules].

This works out to approximately 8.4 kWh per day [1,535 kWh divided by 182 days], and it would largely have to be made up for by the heating system of the home. Thus, during the Winter months, the proposed temperate water tank (10) system would be essentially energy neutral, and therefore neither save any energy, nor cost any energy, for the homeowner.

During Summer, because the indoor temperature of a home is generally warmer than it is during the Winter, the proposed temperate water tank (10) could potentially provide temperate water that is 27° C. [80° F.], at little or no cost, by transferring heat from the typically 27° C. [80° F.] ambient air inside the home over to the cold water. Since 60% of the annual water consumption occurs during the Summer months, it means that 180,000 kg [396,900 lb] of water could be heated by the temperate water tank (10) to raise the temperature of the cold water by 17° C. [from 10° C. up to 27° C.]. The energy required to do this would be 17 kilogram-calories for each kg of water [1 kilogram-calorie heats 1 kg of water by 1° C.], therefore the energy required to heat 180,000 kg of water would be 3,060,000 kilogram-calories. Again, since a kilogram-calorie is equal to 4,186 joules, the total energy would be 12,809,160,000 joules, which is 3,558 kWh for the season. [1 kWh=3,600,000 joules].

This works out to about 19.5 kWh per day [3,558 kWh divided by 182 days]. This energy would be entirely free, because all of that heat energy is derived from the 27° C. [80° F.] ambient air in the home.

Also, during the Summer, a primary concern for a homeowner is to keep the inside of the home cool. This can sometimes be done by opening windows, but it is also sometimes desired to cool the home using some form of air-conditioner, which consumes a large amount of electrical energy. Installation of the proposed temperate water supply system (25, 31, 33) would help to cool the home at little or no cost, because the heat exchanger (30) would be extracting its heat energy from the 27° C. [80° F.], or warmer, ambient air in the home. The amount of energy that would be extracted from the ambient air of the home in order to heat the 180,000 kg [396,900 lb] of water would be 3,060,000 kilogram-calories [11,907,000 Btu], which is 12,809,160,000 joules or 3,558 kWh, for the season. This also works out to about 19.5 kWh per day [3,558 kWh divided by 182 days].

Thus, during the Summer months, the proposed temperate water supply system (25, 31, 33) would potentially heat all incoming cold water from 10° C. [50° F.] up to 27° C. [80° F.] at little or no cost to the homeowner, which would be an energy saving of 19.5 kWh per day. Also, at the same time, the proposed temperate water supply system would potentially cool the interior of the home by removing heat energy, that is equivalent to 19.5 kWh per day, from the hot ambient air in the home. This means that any air-conditioning in the home would consume 9.5 kWh less electricity per day, based on the assumption that an average air-conditioner consumes approximately half as much energy to transfer a given amount of energy from inside a building to the outside. Added together, this represents an energy saving of 28.5 kWh per day for the homeowner.

Other important considerations are that there would be the equivalent of 19.5 kWh per day less heat energy that is blown out from the condenser unit of the air-conditioner into the atmosphere for the neighbors, and also there would be less electricity required from the national grid during times of peak demand. From an environmental point of view, the proposed temperate water supply system (25, 31, 33) would provide over 5 megawatt hours of free energy annually to the homeowner, which would be pollution free, while at the same time effectively eliminating more than 1 tone of carbon dioxide that would otherwise be emitted into the atmosphere annually.

A first advantage of the proposed temperate water supply unit is that, if properly sized with respect to the expected consumption rate of temperate water in the residence, only temperate water is supplied to the pipes, fixtures, and appliances. This would reduce and could virtually eliminate the likelihood of having any of the condensation problems that exist when those pipes, fixtures and appliances have been supplied with cold water.

A second advantage is that temperate water would be readily available at all sinks and washbasins in the home for such things as washing, rinsing, or cleaning teeth, without any need to turn on the hot water tap, except on those occasions when hot water is really required. This would certainly cut down on the unnecessary consumption of hot water.

A third advantage is that the hot water tank would be supplied with temperate water instead of cold water. This means that the input water to the hot water tank would be between 21° C. [70° F.] and 27° C. [80° F.], instead the present 10° C. [50° F.]. Therefore, in order to heat the temperate input water up to 54° C. [130° F.], it would require between 25% and 37% less energy from the gas or electricity utilities than would have been required to heat input water that was cold. This is because the input water would be between 11° C. [20° F.] and 17° C. [30° F.] warmer to begin with. A side effect from this is that the recovery rate for the hot water tank would also effectively be made faster as well. The recovery rate is the rate at which the hot water tank can produce hot water from a tank full of cold water, as occurs when all the stored hot water is consumed.

A fourth advantage is that between 25% and 37% less hot water would be required for a given bath, or for a given shower, when it is mixed with temperate water instead of being mixed with cold water, provided the conditions are the same, such as having similar quantities and temperatures of the bath water, or of the shower water. A side effect from this is that the effective capacity of the hot water tank would also be increased. It is possible that the useful life of the hot water tank would also be extended as a result.

A fifth advantage is that the temperate water tank will help to reduce the humidity and the temperature of the indoor environment when the air is hot and humid during the summer months, which can be used to augment any air-conditioning in the home, and thereby help to lower the cost of operating the air-conditioner. During winter months, the temperate water tank can be bypassed if desired, but it could also be advantageous to leave it in operation all year round. Another possibility is that an electrical heating element could optionally be installed inside the temperate water tank (10) that would be for use only during the winter months, and which would be thermostatically controlled to only heat the water inside the temperate water tank (10) to a temperature of 21° C. [70° F.].

A sixth advantage is that the temperate water tank is entirely passive in its function, and no energy whatever is consumed for its basic operation. However, the efficiency of the temperate water tank can be greatly enhanced by the installation of a fan, which will of course consume a small amount of energy.

A seventh advantage is that the temperate water tank would provide a reserve supply of cold or temperate water in the event of an interruption of the water service from the main.

Additionally, from a homeowner's perspective, the operation of a three pipe water supply system would be little different from the operation of the two pipe water supply system that is in standard use today, except that there would be a reduced concern about condensation, and there would be much less need to turn on the hot water taps.

The temperate water tank can be made in a manner that is similar to the way that existing hot water tanks are made (i.e.) with a steel body that is glass lined on the inside and foam insulated on the outside, and also with both the tank and the insulation being totally encased in a vapor resistant exterior housing. There is no requirement for any heating elements, or for any gas or electrical connections.

All pipes and fittings may be made of copper or brass due to its good thermal conductivity, and for protection from corrosion. The support bar or pipe may also be made of copper or brass for protection from corrosion.

Also, for convenience, the heat exchanger (100) could be connected to the temperate water tank (50 or 80) via union joints located at the mid point of the lower horizontal pipe (130) and at the mid point of the upper horizontal pipe (132 or 84), or at the mid point of the uninsulated extension pipe (83). This would provide for ease of connection and disconnection between the heat exchanger (100) and the temperate water tank (50 or 80).

The cold water pipe inside the temperate water tank, and also the discharge pipe from the bleeder valve, can be made of plastic.

The stand can be made from wood or from a metal, such as steel, but with provision that it be made so that it is well protected from any moisture.

The drip tray can be made from plastic, stainless steel, or from any other suitable material.

The installation of a three pipe water supply system into a home would result in both convenience and the conservation of energy for the homeowner. It would also help to solve all of the dampness problems that are caused by condensation from cold water pipes and plumbing fixtures in the home. Not only will this mean lower utility bills for the homeowner, but it will also lessen the overall demand for energy, particularly electrical energy, which is good for the environment.

The temperate water supply system of the present invention could be applied, on a much larger scale, for multiple apartment buildings, office buildings, institutions and the like, with benefits to all concerned.

The term 'pipe' has been identified throughout this disclosure as transporting water. It will be noted that any suitable water transport conduit could be used, such as tubing, and that the invention is not restricted to the use of pipe for the transport of water.

The preferred embodiment of the water supply system of the present invention does not require the use of a pump to pump water therethrough. By not using a pump, the system eliminates one source of maintenance, thus making the system more convenient to use than complex systems of the prior art that have many moving parts and that are relatively high maintenance. It is nonetheless optionally possible, however, to include one or more pumps within the system of the present invention for pumping water through the heat exchanger of for pumping water between the storage tank and heat exchanger, as necessary. Since the water being pumped is potable, the pump would have to be selected so as not to contaminate the water. A peristaltic pump would, for example, be suitable for this purpose, however, any other suitable pump could be used.

While the above description constitutes the preferred embodiment, it will be appreciated that the present invention is susceptible to modification and change without departing from the fair meaning of the accompanying claims.

This invention claimed is:

1. A temperate water supply system, comprising:
a heat exchanger, wherein said heat exchanger has a heat exchanger inlet and a heat exchanger outlet and a plurality of water conduits connected in parallel fluid communication with said heat exchanger inlet and with said heat exchanger outlet;
a temperate water storage tank, having a first tank inlet, a first tank outlet, a second tank inlet and a second tank outlet, wherein said first tank inlet is connectable to a cold water source, said first tank outlet is connectable to at least one temperate water use point, said second tank inlet is connectable to said heat exchanger outlet, and said second tank outlet is connectable to said heat exchanger inlet;
wherein, in use, said plurality of water conduits are filled with water and are in contact with ambient air, wherein said ambient air is warmer than said water at least a portion of the time, so that heat is transferred from said ambient air to said water.

2. A temperate water supply system as claimed in claim 1, further comprising a drip tray underneath said plurality of water conduits, for collecting condensate that forms thereon.

3. A temperate water supply system as claimed in claim 1, wherein said temperate water storage tank has a top and a bottom and said second tank inlet is positioned proximate said top, and said second tank outlet is positioned proximate said bottom.

4. A temperate water supply system as claimed in claim 1, wherein said temperate water storage tank has a top and a bottom and said second tank inlet is positioned at a point approximately halfway between said top and said bottom, and said second tank outlet is positioned proximate said bottom.

5. A temperate water supply system as claimed in claim 1, wherein said temperate water storage tank has a top and a bottom and wherein said first tank inlet is positioned proximate said bottom.

6. A temperate water supply system as claimed in claim 1, further comprising a fan for blowing ambient air over said plurality of water conduits.

7. A temperate water supply system as claimed in claim 6, further comprising a differential thermostat, wherein said differential thermostat is adapted to read the temperature of ambient air around said heat exchanger and the temperature of the water in the heat exchanger, and wherein the differential thermostat is operatively connected to said fan in such a way that said fan only operates when the temperature of the ambient air around said heat exchanger is higher than the temperature of the water in said heat exchanger by a selected amount.

8. A temperate water supply system as claimed in claim 6, wherein said fan is positioned downstream from a fan inlet, and said fan inlet is positioned in a living area of a residence.

9. A temperate water supply system as claimed in claim 8, wherein said temperate water supply system is positioned in a basement of said residence and a fan duct fluidly connects said fan inlet to said fan.

10. A temperate water supply system as claimed in claim 1, wherein said temperate water outlet is fluidly connected to a toilet.

11. A temperate water supply system as claimed in claim 1, wherein said temperate water outlet is fluidly connected to an inlet of a hot water tank.

12. A temperate water supply system as claimed in claim 1, wherein said heat exchanger outlet and said second tank inlet are positioned higher than said heat exchanger inlet and said second tank outlet, so that, when said temperate water storage tank and said heat exchanger are full of water, natural convection causes water to flow upwards through said plurality of water conduits and to circulate between said temperate water storage tank and said heat exchanger.

13. A domestic water supply system comprising:
a temperate water supply system including a temperate water storage tank and a heat exchanger, wherein said temperate water storage tank has a first tank inlet, a first tank outlet, a second tank inlet and a second tank outlet, wherein said first tank inlet is connectable to a cold water source, wherein said first tank outlet is connectable to at least one temperate water use point, and wherein said heat exchanger has a heat exchanger inlet and a heat exchanger outlet and a plurality of water conduits connected in parallel fluid communication with said heat exchanger inlet and said heat exchanger outlet, wherein said heat exchanger inlet is connectable to said second tank outlet, and said heat exchanger outlet is connectable to said second tank inlet, wherein, in use, said plurality of water conduits are filled with water and are in contact with ambient air that is warmer than said water at least a portion of the time, so that heat is transferred from said ambient air to said water; and
a hot water storage tank having a hot water tank inlet and a hot water tank outlet, wherein said hot water tank outlet is connected to at least one hot water use point, and wherein said hot water tank inlet is connected to at least one of said temperate water tank outlet and said cold water source.

14. A domestic water supply system as claimed in claim 13, further comprising a drip tray underneath said plurality of water conduits, for collecting condensate that forms thereon.

15. A domestic water supply system as claimed in claim 13, wherein said temperate water storage tank has a top and a bottom and said second tank inlet is positioned proximate said top, and said second tank outlet is positioned proximate said bottom.

16. A temperate water supply system as claimed in claim 13, wherein said temperate water storage tank has a top and a bottom and said second tank inlet is positioned at a point approximately halfway between said top and said bottom, and said second tank outlet is positioned proximate said bottom.

17. A domestic water supply system as claimed in claim 13, wherein said temperate water storage tank has a top and a bottom and wherein said first tank inlet is positioned proximate said bottom.

18. A domestic water supply system as claimed in claim 13, further comprising a fan for blowing ambient air over said plurality of water conduits.

19. A domestic water supply system as claimed in claim 18, further comprising a differential thermostat, wherein said differential thermostat is adapted to read the temperature of ambient air around said heat exchanger and the temperature of the water in the heat exchanger, and wherein the differential thermostat is operatively connected to said fan in such a way that said fan only operates when the temperature of the ambient air around said heat exchanger is higher than the temperature of the water in said heat exchanger by a selected amount.

20. A domestic water supply system as claimed in claim 18, wherein said fan is positioned downstream from a fan inlet, and said fan inlet is positioned in a living area of a residence.

21. A domestic water supply system as claimed in claim 20, wherein said temperate water supply system is positioned in a basement of said residence and a fan duct fluidly connects said fan inlet to said fan.

22. A domestic water supply system as claimed in claim 13, wherein said temperate water outlet is fluidly connected to a toilet.

23. A domestic water supply system as claimed in claim 13, wherein said hot water tank inlet is connectable selectably to any one of said temperate water supply system outlet and said cold water source.

24. A domestic water supply system as claimed in claim 13, wherein said cold water source is connected to at least one cold water use point.

* * * * *